US012561062B2

(12) United States Patent
Roy

(10) Patent No.: US 12,561,062 B2
(45) Date of Patent: Feb. 24, 2026

(54) WRITE-BACK CACHING ACROSS CLUSTERS

(71) Applicant: NetApp, Inc., San Jose, CA (US)

(72) Inventor: Dipankar Roy, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 18/194,399

(22) Filed: Mar. 31, 2023

(65) Prior Publication Data

US 2024/0329848 A1 Oct. 3, 2024

(51) Int. Cl.
G06F 3/06 (2006.01)

(52) U.S. Cl.
CPC .......... G06F 3/0613 (2013.01); G06F 3/0635 (2013.01); G06F 3/067 (2013.01)

(58) Field of Classification Search
CPC ...... G06F 3/067; G06F 3/0613; G06F 3/0632; G06F 3/0631
USPC ......................................... 711/154, 118, 135
See application file for complete search history.

(56) References Cited

U.S. PATENT DOCUMENTS

| | | | |
|---|---|---|---|
| 5,768,593 A | 6/1998 | Walters et al. | |
| 6,230,241 B1 | 5/2001 | McKenney | |
| 6,433,787 B1 | 8/2002 | Murphy | |
| 7,552,223 B1 * | 6/2009 | Ackaouy | G06F 16/10 709/213 |
| 8,402,226 B1 | 3/2013 | Faibish et al. | |
| 9,239,790 B1 | 1/2016 | Banerjee et al. | |

| | | | |
|---|---|---|---|
| 9,600,200 B1 | 3/2017 | Wallace et al. | |
| 10,114,754 B1 | 10/2018 | Pendharkar et al. | |
| 10,154,090 B1 | 12/2018 | Baergen et al. | |
| 10,365,798 B1 | 7/2019 | El Kaissi | |
| 10,860,388 B1 | 12/2020 | Ozturk | |
| 2003/0236957 A1 | 12/2003 | Miller et al. | |
| 2006/0155944 A1 | 7/2006 | Kano | |
| 2007/0174551 A1 | 7/2007 | Cornwell et al. | |
| 2008/0016295 A1 | 1/2008 | Yim et al. | |
| 2008/0162822 A1 | 7/2008 | Okuyama et al. | |
| 2009/0006606 A1 * | 1/2009 | Lubbers | H04L 49/356 709/224 |
| 2009/0100224 A1 | 4/2009 | Wang | |

(Continued)

OTHER PUBLICATIONS

Non Final Office Action mailed on Jun. 21, 2024 for U.S. Appl. No. 18/194,332, filed Mar. 31, 2023, 27 pages.

(Continued)

*Primary Examiner* — Hashem Farrokh
(74) *Attorney, Agent, or Firm* — HAYNES AND BOONE, LLP

(57) ABSTRACT

A method and computing device for write-back caching. A client write request to write new data to a selected file on a volume (for which the client has mounted the corresponding cache) may be received at a network module of a node and processed to generate a write request that can be forwarded to a disk module hosting the cache (at a same or different node than received the client write request). The data is written to the cache and confirmation of the write is sent to the client. Accumulated data in the cache is written back to the volume (hosted by a different node than the cache) when at least one of a cache file threshold or a cache threshold is met. These parameters are set to values that reduce write latency, increase throughput, and help ensure data consistency and resiliency.

20 Claims, 11 Drawing Sheets

(56) References Cited

U.S. PATENT DOCUMENTS

| | | | |
|---|---|---|---|
| 2009/0300288 A1 | 12/2009 | Lefebvre et al. | |
| 2009/0307686 A1 | 12/2009 | Hepkin | |
| 2011/0119461 A1 | 5/2011 | Desai et al. | |
| 2011/0219349 A1* | 9/2011 | Foster | G06F 30/00 |
| | | | 716/139 |
| 2012/0239884 A1* | 9/2012 | Ishizawa | G06F 12/126 |
| | | | 711/E12.029 |
| 2012/0254117 A1* | 10/2012 | Kishi | G06F 11/1451 |
| | | | 707/640 |
| 2012/0303905 A1 | 11/2012 | Zhang et al. | |
| 2013/0046920 A1* | 2/2013 | Ryu | G06F 3/0649 |
| | | | 711/E12.008 |
| 2013/0132674 A1 | 5/2013 | Sundrani | |
| 2013/0179790 A1* | 7/2013 | Nadiadi | G06Q 30/02 |
| | | | 715/730 |
| 2014/0012867 A1 | 1/2014 | Moss et al. | |
| 2014/0089258 A1 | 3/2014 | She | |
| 2014/0173326 A1 | 6/2014 | Belluomini et al. | |
| 2014/0297966 A1 | 10/2014 | Aoyagi et al. | |
| 2015/0149605 A1 | 5/2015 | De La Iglesia | |
| 2015/0317084 A1 | 11/2015 | Hwang et al. | |
| 2016/0004408 A1 | 1/2016 | Yun | |
| 2016/0246724 A1 | 8/2016 | Boehm et al. | |
| 2016/0267020 A1* | 9/2016 | Wang | G06F 12/0891 |
| 2017/0004083 A1 | 1/2017 | Jain et al. | |
| 2017/0315913 A1 | 11/2017 | Jibbe et al. | |
| 2018/0060100 A1 | 3/2018 | Tsirkin et al. | |
| 2018/0234503 A1 | 8/2018 | Lan et al. | |
| 2018/0260340 A1 | 9/2018 | Chen et al. | |
| 2018/0262566 A1 | 9/2018 | Liu et al. | |
| 2019/0057030 A1 | 2/2019 | Yang et al. | |
| 2019/0095284 A1 | 3/2019 | Balasubramanian et al. | |
| 2020/0034295 A1 | 1/2020 | Battaiola Kreling et al. | |
| 2021/0124492 A1* | 4/2021 | Savir | G06F 3/0631 |
| 2021/0303399 A1 | 9/2021 | Jarvis | |
| 2022/0091976 A1* | 3/2022 | Soukhman | G06F 12/0822 |
| 2022/0114274 A1 | 4/2022 | Fathalla et al. | |
| 2022/0374163 A1 | 11/2022 | Colella et al. | |
| 2023/0086991 A1 | 3/2023 | Zhang et al. | |
| 2023/0342052 A1 | 10/2023 | Chen et al. | |
| 2024/0036883 A1 | 2/2024 | Kodavanji et al. | |
| 2024/0061786 A1 | 2/2024 | Zhang et al. | |
| 2024/0126468 A1 | 4/2024 | Helmick et al. | |
| 2024/0152454 A1 | 5/2024 | Bai et al. | |
| 2024/0329878 A1 | 10/2024 | Roy | |
| 2024/0330184 A1 | 10/2024 | Roy | |

OTHER PUBLICATIONS

Final Office Action mailed on Dec. 30, 2024 for U.S. Appl. No. 18/194,332, filed Mar. 31, 2023, 31 pages.

Non-Final Office Action mailed on Apr. 9, 2025 for U.S. Appl. No. 18/194,332, filed Mar. 31, 2023, 31 pages.

Non-Final Office Action mailed on Apr. 11, 2025 for U.S. Appl. No. 18/542,273, filed Dec. 15, 2023, 30 pages.

Final Office Action mailed on Sep. 30, 2025 for U.S. Appl. No. 18/194,332, filed Mar. 31, 2023, 35 pages.

* cited by examiner

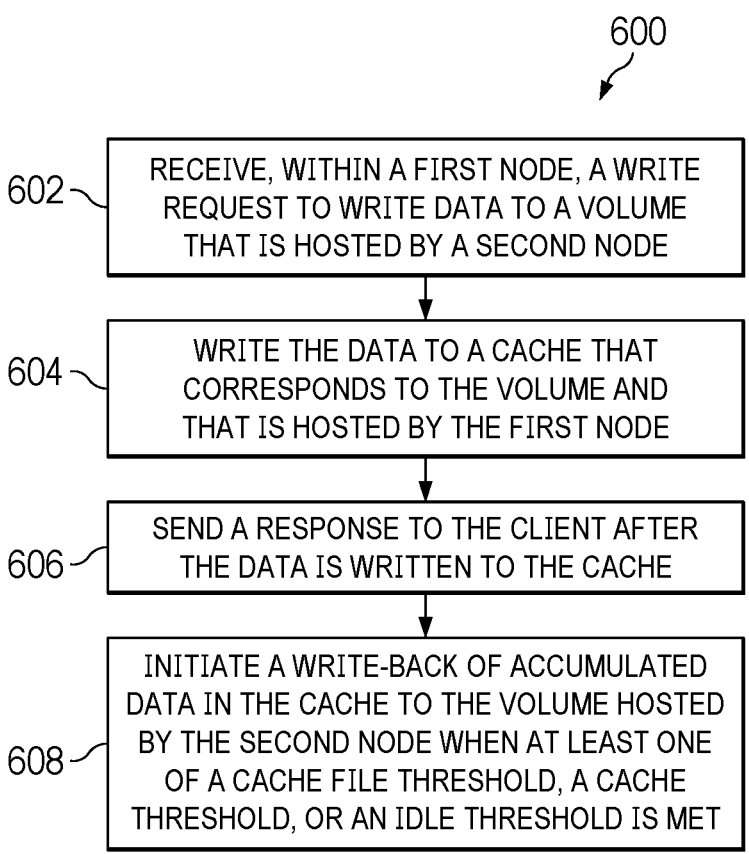

600

602   RECEIVE, WITHIN A FIRST NODE, A WRITE REQUEST TO WRITE DATA TO A VOLUME THAT IS HOSTED BY A SECOND NODE

604   WRITE THE DATA TO A CACHE THAT CORRESPONDS TO THE VOLUME AND THAT IS HOSTED BY THE FIRST NODE

606   SEND A RESPONSE TO THE CLIENT AFTER THE DATA IS WRITTEN TO THE CACHE

608   INITIATE A WRITE-BACK OF ACCUMULATED DATA IN THE CACHE TO THE VOLUME HOSTED BY THE SECOND NODE WHEN AT LEAST ONE OF A CACHE FILE THRESHOLD, A CACHE THRESHOLD, OR AN IDLE THRESHOLD IS MET

FIG. 6

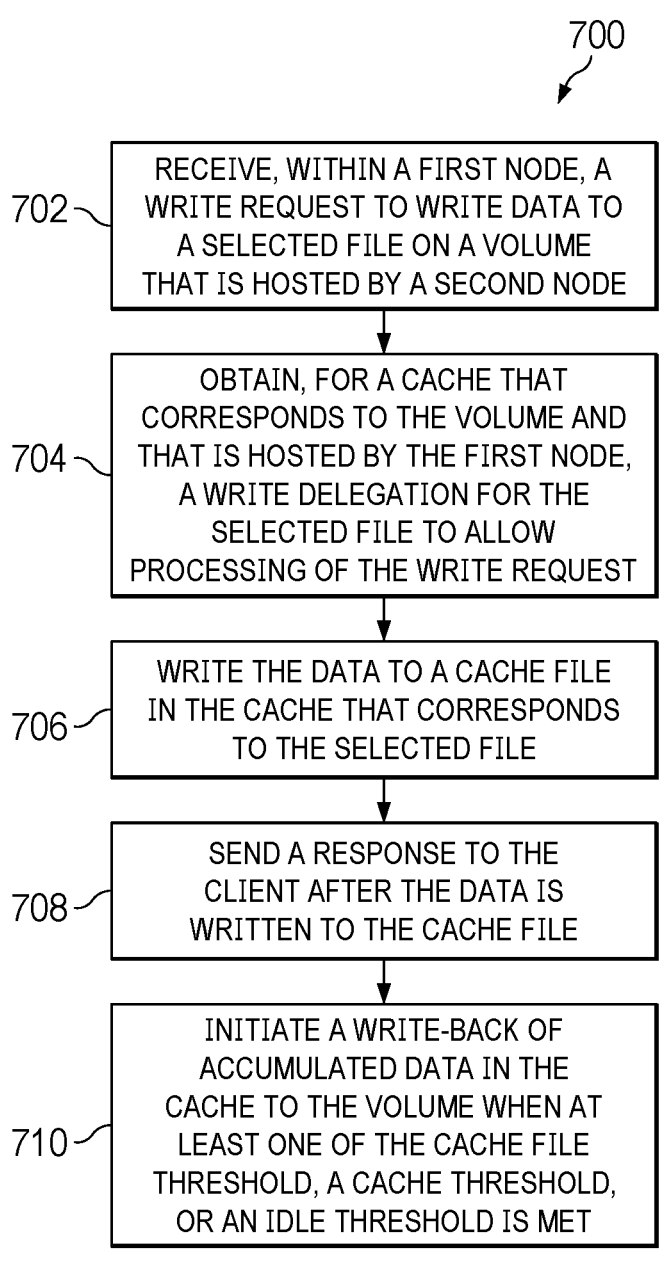

700

702 — RECEIVE, WITHIN A FIRST NODE, A WRITE REQUEST TO WRITE DATA TO A SELECTED FILE ON A VOLUME THAT IS HOSTED BY A SECOND NODE

704 — OBTAIN, FOR A CACHE THAT CORRESPONDS TO THE VOLUME AND THAT IS HOSTED BY THE FIRST NODE, A WRITE DELEGATION FOR THE SELECTED FILE TO ALLOW PROCESSING OF THE WRITE REQUEST

706 — WRITE THE DATA TO A CACHE FILE IN THE CACHE THAT CORRESPONDS TO THE SELECTED FILE

708 — SEND A RESPONSE TO THE CLIENT AFTER THE DATA IS WRITTEN TO THE CACHE FILE

710 — INITIATE A WRITE-BACK OF ACCUMULATED DATA IN THE CACHE TO THE VOLUME WHEN AT LEAST ONE OF THE CACHE FILE THRESHOLD, A CACHE THRESHOLD, OR AN IDLE THRESHOLD IS MET

FIG. 7

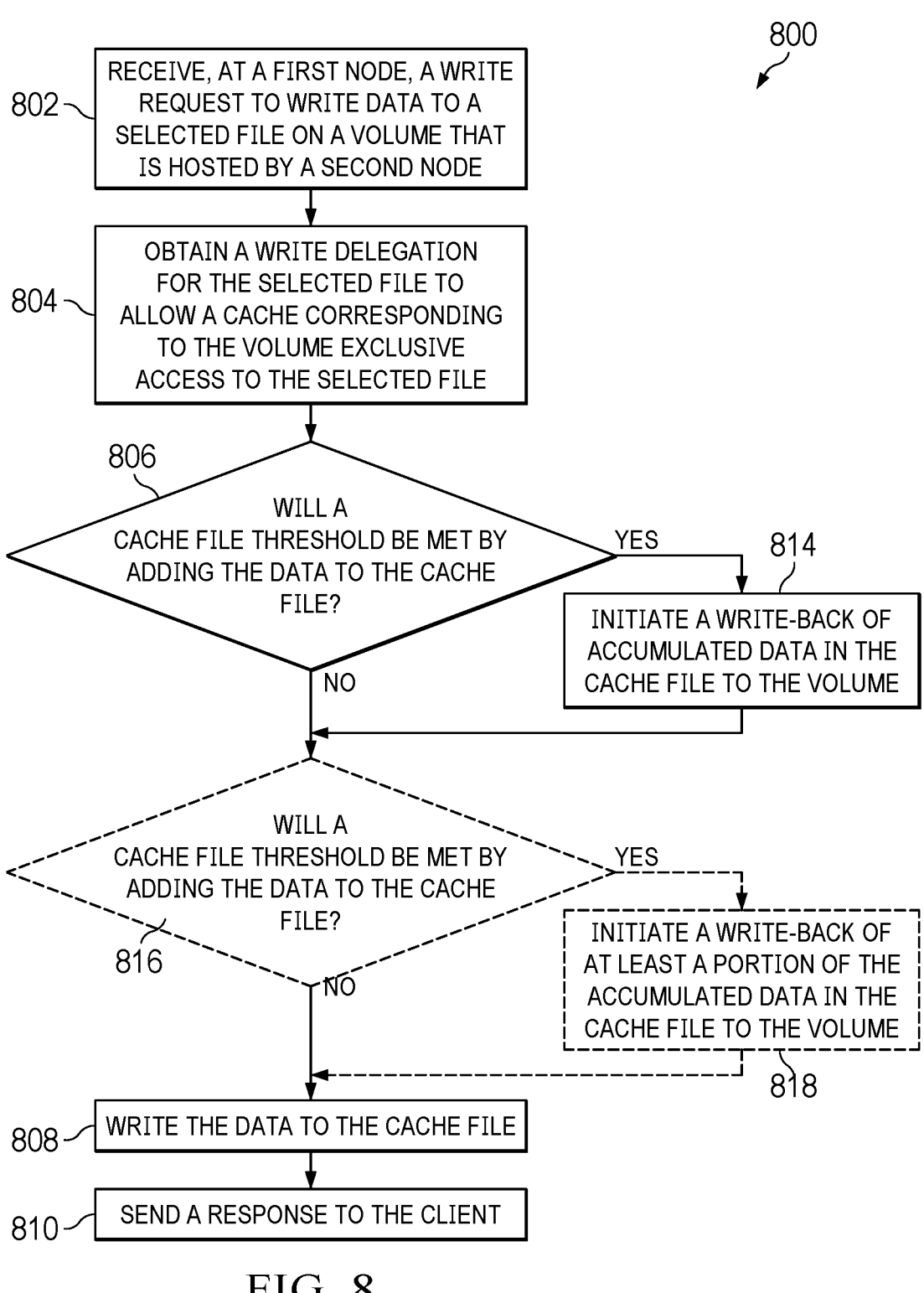

800

802 — RECEIVE, AT A FIRST NODE, A WRITE REQUEST TO WRITE DATA TO A SELECTED FILE ON A VOLUME THAT IS HOSTED BY A SECOND NODE

804 — OBTAIN A WRITE DELEGATION FOR THE SELECTED FILE TO ALLOW A CACHE CORRESPONDING TO THE VOLUME EXCLUSIVE ACCESS TO THE SELECTED FILE

806 — WILL A CACHE FILE THRESHOLD BE MET BY ADDING THE DATA TO THE CACHE FILE?

YES    814

INITIATE A WRITE-BACK OF ACCUMULATED DATA IN THE CACHE FILE TO THE VOLUME

NO

WILL A CACHE FILE THRESHOLD BE MET BY ADDING THE DATA TO THE CACHE FILE?

816

YES

INITIATE A WRITE-BACK OF AT LEAST A PORTION OF THE ACCUMULATED DATA IN THE CACHE FILE TO THE VOLUME

818

NO

808 — WRITE THE DATA TO THE CACHE FILE

810 — SEND A RESPONSE TO THE CLIENT

FIG. 8

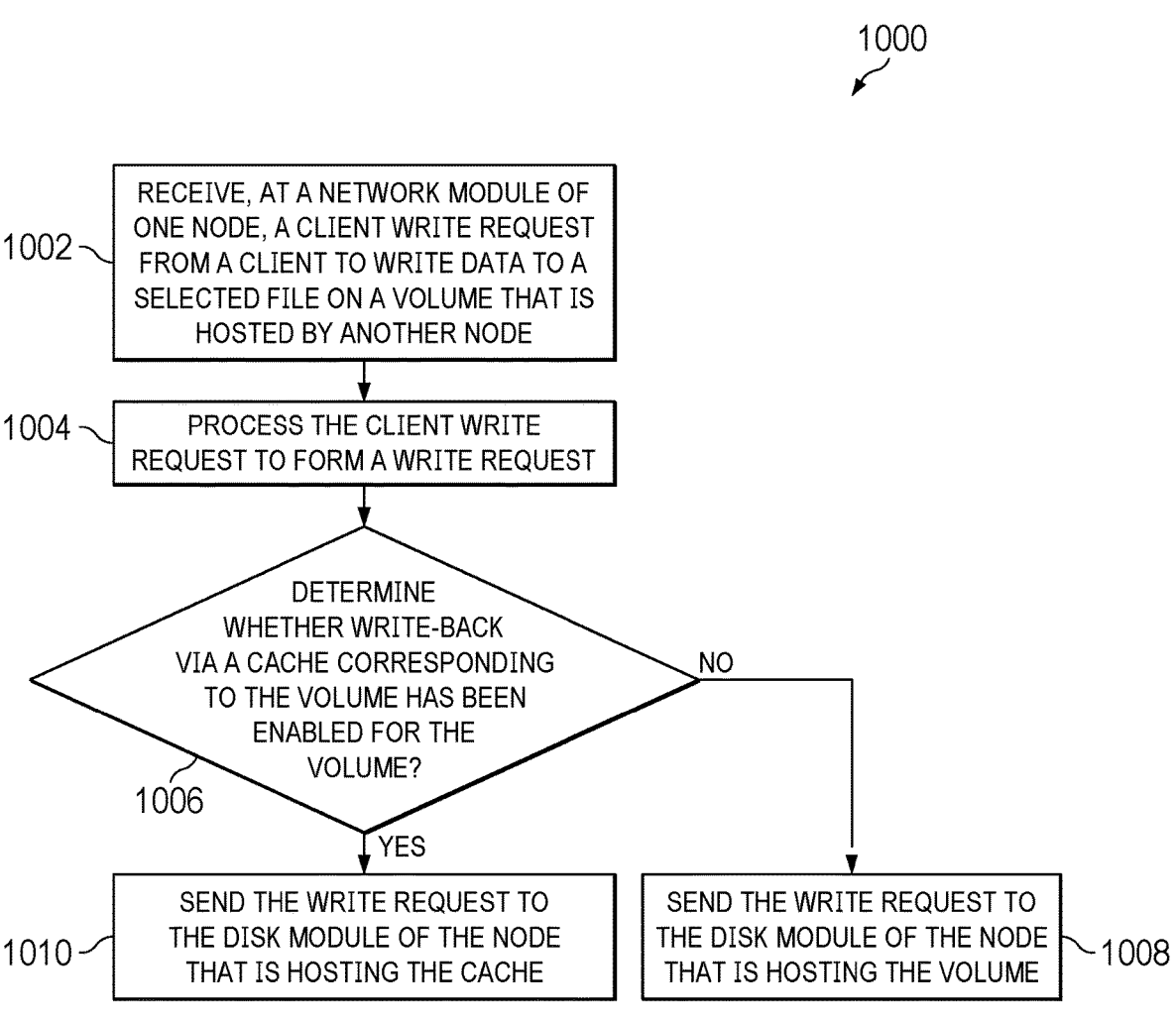

1000

RECEIVE, AT A NETWORK MODULE OF ONE NODE, A CLIENT WRITE REQUEST FROM A CLIENT TO WRITE DATA TO A SELECTED FILE ON A VOLUME THAT IS HOSTED BY ANOTHER NODE

1002

PROCESS THE CLIENT WRITE REQUEST TO FORM A WRITE REQUEST

1004

DETERMINE WHETHER WRITE-BACK VIA A CACHE CORRESPONDING TO THE VOLUME HAS BEEN ENABLED FOR THE VOLUME?

1006

NO

YES

SEND THE WRITE REQUEST TO THE DISK MODULE OF THE NODE THAT IS HOSTING THE CACHE

1010

SEND THE WRITE REQUEST TO THE DISK MODULE OF THE NODE THAT IS HOSTING THE VOLUME

WRITE-BACK CACHING ACROSS CLUSTERS

CROSS-REFERENCE TO RELATED APPLICATIONS

This application is related to U.S. patent application Ser. No. 18/194,332, entitled "Write-Back Caching Across Clusters," filed even date hereof and incorporated herein by reference in its entirety.

TECHNICAL FIELD

The present description relates to caching, and more specifically, to methods and systems for write-back caching across clusters.

BACKGROUND

A cache is a component formed by hardware, software, or both that stores data to enable future requests for data to be served faster. The cache allows for faster retrieval of the data than an underlying data store (e.g., disk). When handling write requests, caching typically occurs based on three different cache writing policies: write-through, write-around, and write-back. With write-through, data is written to the cache and the underlying data store at the same time. Completion of the write request is confirmed once the data has been written to both the cache and the underlying data store. This type of policy ensures fast retrieval but adds to write latency. With write-around, data is written only to the underlying data store without writing to the cache so that completion of the write request is confirmed as soon as the data is written to the underlying data store. This type of policy prevents the cache from being flooded with data that may not be reread but can add to read latency. With write-back, data is written to the cache and completion of the write request confirmed. The data is then also written to the underlying data store with the completion notification not being dependent on this writing. This type of policy provides low latency and high throughput and is therefore preferred in certain situations. However, at least some currently available systems and methods are unable to provide write-back caching within and/or between clusters with the desired level of performance.

BRIEF DESCRIPTION OF THE DRAWINGS

The present disclosure is best understood from the following detailed description when read with the accompanying figures.

FIG. 6 is a flow diagram of a process for write-back caching in accordance with one or more example embodiments.

FIG. 7 is a flow diagram of a process for write-back caching in accordance with one or more example embodiments.

FIG. 8 is a flow diagram of a process for write-back caching in accordance with one or more example embodiments.

FIG. 10 is a flow diagram of a process for generating a write request in accordance with one or more example embodiments.

DETAILED DESCRIPTION

I. Overview

Figure 1:
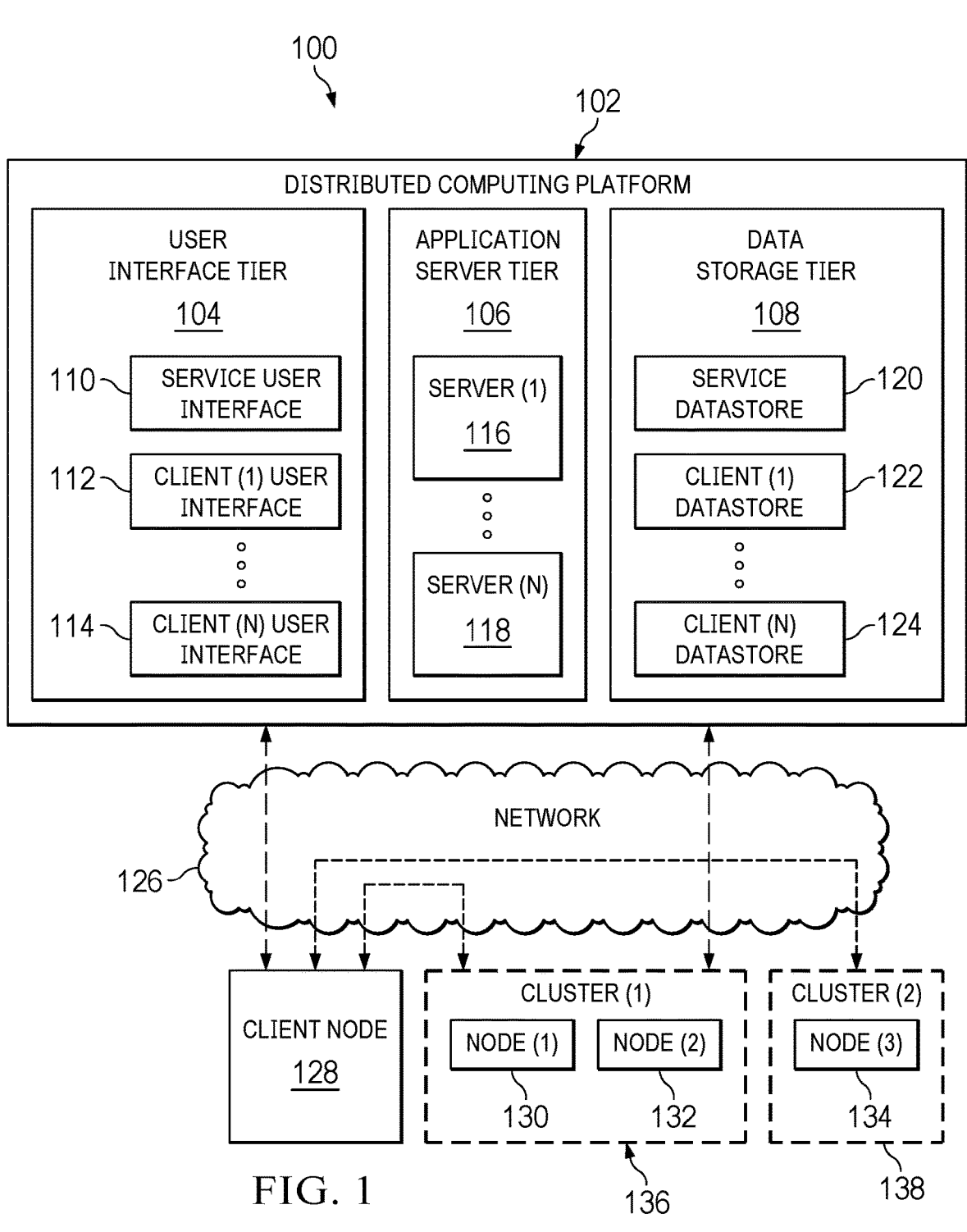
FIG. 1 is a schematic diagram illustrating a computing environment in accordance with one or more example embodiments.

The embodiments described herein recognize that write-back caching can provide reduced write latency and high throughput. However, the nature of clustered networks can make write-back caching challenging. In particular, write-back caching in clustered networks using currently available methods may be faced with performance limitations that make using such write-back caching difficult for large datasets.

For example, in certain architectures, write-back caching within a same cluster (e.g., both the cache and its corresponding volume are hosted by nodes within the same cluster) may be faced with limits regarding the maximum amount of data that can be written to a file in a cache in a single write operation and the maximum amount of data that can be written back to the corresponding volume in a single write-back message. When the maximum amount of data that can be written to a file in the cache is small (e.g., 64 kilobytes), write-back operations to write-back the data from the cache to the corresponding volume are triggered more frequently. The data is written back to the volume prior to the cache being able to accept another write operation to write data to the same file in the cache. When the maximum amount of data that can be written back to the corresponding volume in a single write-back message is small (e.g., 64 kilobytes), multiple write-back messages are needed to fully write-back the data that has accumulated in the cache to the corresponding volume.

These types of limitations may result in decreased write-back performance for large datasets as compared to other types of caching policies (e.g., write-around caching). Such performance may be tolerable or otherwise acceptable for writes involving small amounts of data within the same cluster but unacceptable for large datasets where performance issues can be costly. Further, such limitations as those described above may increase write latency and decrease throughput in cross-cluster (or intercluster) communications in a manner that is unacceptable.

Additionally, some currently available methods for write-back caching may face challenges in keeping data consistent at the volume underlying the cache with data and records resilient enough to be maintained between the cache and underlying volume across various scenarios where cross-cluster communications are occurring. Such scenarios include, for example, but are not limited to, shutdowns, reboots, etc.

Thus, the embodiments described herein provide methods, systems, and machine-readable media for enabling write-back caching across clusters without sacrificing write performance. Write-back caching across clusters may include write-back caching within a same cluster of nodes, between two or more clusters of nodes, or both. The embodiments described herein provide techniques that enable write-back caching across clusters with reduced write latency and increased throughput. In this manner, the embodiments described herein improve the functioning of the computing devices on which these techniques are implemented.

In one or more embodiments, a write request is received at the disk module (or data module) of a first node in a cluster network that includes one or more clusters of nodes. The write request, which may have originated from a client, is to write data to a selected file on a volume that is managed (or owned, hosted, etc.) by a second node. In some cases, the second node is within a same cluster as the first node. In other cases, the two nodes belong to two different clusters but are capable of communicating with each other over a cluster interface. In one or more embodiments, the write request received at the disk module may be a modified version of the client's original write request (or client write request) that is received. For example, the client write request may be received at the network module of the first node, processed (e.g., modified or otherwise transformed to form the write request), and then passed as the write request to the disk module of the first node for processing. In another example, the client write request may be received at the network module of a different node. This other node may process the client write request to generate the write request that is then forwarded on to the disk module of the first node via the cluster interface.

The disk module, if it does not already have authorization to write to the volume, obtains this authorization. This authorization may be referred to as, for example, a write delegation. In one or more embodiments, the disk module determines whether writing the data in the write request to the cache in a cache file that corresponds to the selected file identified by the client write request will cause a cache file threshold to be met. If performing the write will not cause the cache file threshold to be met, the write occurs.

If, however, performing the write will cause the cache file threshold to be met, the cache file is flushed or cleared. In other words, the disk module initiates a write-back that results in one or more write-back messages being sent to write the data that has accumulated in the cache file to the selected file in the corresponding volume. Once these write-back messages have been sent and the data written back to the corresponding volume, the cache file is flushed. Although these write-back messages are sent and processed one at a time, the payload size of these write-back messages may be tunable to improve write latency and throughput. Once the cache file has been flushed, the data is written to the cache file and the disk module generates and sends a response that the write has been completed. In one or more embodiments, the response is sent from the disk module to the client via the network module in communication with the client. The terms "flushed" and "cleared," or derivatives thereof, with respect to the cache file or cache may be used interchangeably herein.

In some embodiments, the disk module also determines whether writing the data to the cache file in the cache will cause a cache threshold to be met. The cache threshold is a threshold for the entire cache so that the cache does not ever hold an overly large amount of data that has yet to be written back to the corresponding volume. The cache threshold helps ensure data consistency and resiliency in the face of certain scenarios (e.g., shutdowns, reboots, hardware/software failure, etc.).

If performing the write will not cause the cache threshold to be met, the write occurs. If, however, performing the write will cause the cache threshold to be met, at least a portion of the accumulated data in the cache is flushed. In some cases, the entire cache is flushed. Once the cache has been flushed, the data is written to the cache file corresponding to the selected file and the disk module generates and sends a response that the write has been completed.

In one or more embodiments, the disk module runs an idle scrubber that runs in response to the occurrence of a trigger event to determine whether an idle threshold has been met for any cache files in the cache. The idle threshold may be the amount of time that a cache file has remained unmodified (or unwritten to). If the idle threshold is met for any cache files, those cache files are flushed. The trigger event for running the idle scrubber may be, for example, the lapse of a timer such that the idle scrubber is run at a predetermined interval (e.g., every 30 seconds, 1 minutes, 2 minutes, 3 minutes, 5 minutes, etc.). The cache threshold helps ensure data consistency and resiliency in the face of certain scenarios (e.g., shutdowns, reboots, hardware/software failure, etc.).

Each of the cache file threshold, the cache threshold, the idle threshold, and the payload size of the write-back messages is a tunable parameter that can be selected to ensure the desired level of write performance. For example, these parameters can be set to reduce write latency, increase throughput, or both. These parameters may also be tuned based on performance requirements, expected workloads, observed workloads, or a combination thereof. Tuning of a parameter may be performed by a network administrator or may be performed automatically based on observations, (e.g., observed workloads), measurements, performance requirements, one or more predefined rules, one or more criteria being met, or a combination thereof.

Further, these parameters may help maintain data consistency and resiliency. For example, the cache file threshold, the cache threshold, and the idle threshold may be set to help prevent data buildup at the cache, which may help avoid a rush to get the data written to the corresponding volume at the time of, for example, a snapshot.

II. Exemplary Architectures for Computing/Networking Environments

Referring now to the figures, FIG. 1 is a schematic diagram illustrating a computing environment 100 in accordance with one or more example embodiments. The computing environment 100 may be one example of an implementation for an environment in which write-back caching across clusters is performed. The computing environment 100 includes a distributed computing platform 102 that can be used to manage the storage of and access to data on behalf of client devices and/or storage resources. The distributed computing environment 100 may be implemented using a cloud storage environment, a multi-tenant platform, a hyperscale infrastructure comprising scalable server architectures, virtual networking, or a combination thereof.

The distributed computing platform 102 may include, for example, a user interface tier 104, an application server tier 106, and a data storage tier 108. The user interface tier 104 may include a service user interface 110 and one or more client user interfaces for one or more respective client nodes. For example, the one or more client user interfaces may include client (1) user interface 112 and, in some cases, one or more other client user interfaces up to client (N) user interface 114. The application server tier 106 may include one or more servers including, for example, server (1) 116 up to server (N) 118. The number of servers in application server tier 106 may be the same as or different from the number of client user interfaces in user interface tier 104. The data storage tier 108 includes service datastore 120 and one or more client datastores for one or more respective client nodes. For example, the one or more client datastores may include client (1) datastore 122 and, in some cases, one or more other client datastores up to client (N) datastore 124.

The distributed computing platform 102 is in communication via network 126 with one or more client nodes (e.g., client node 128), one or more nodes (e.g., a first node 130, a second node 132, a third node 134, etc.), or both, where the various nodes may form one or more clusters (e.g., a first cluster 136, a second cluster 138, etc.). The embodiments described herein may include actions that can be implemented within a client node (e.g., the client node 128), one or more nodes (e.g., the first node 130, the second node 132, the third node 134), or both. A node may include a storage controller, a server, an on-premise device, a virtual machine such as a storage virtual machine, hardware, software, or a combination thereof. The one or more nodes may be configured to manage the storage and access to data on behalf of the client node 128 and/or other client devices.

One or more of the embodiments described herein include operations implemented across the distributed computing platform 102, client node 128, one or more of first node 130, second node 132, and/or third node 134, or a combination thereof. For example, the client node 128 may transmit operations, such as data operations to read data and write data, and metadata operations (e.g., a create file operation, a rename directory operation, a resize operation, a set attribute operation, etc.), over the network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 134, a storage virtual machine executing within the distributed computing platform 102, etc., so that one or more replicas of the data are maintained. For example, the third node 134 may host a destination storage volume that is maintained as a replica of a source storage volume of the first node 130. Such replicas can be used for disaster recovery and failover.

In one or more embodiments, the techniques described herein include actions implemented by a storage operating system or are implemented by a separate module that interacts with the storage operating system. The storage operating system may be hosted by the client node 128, the distributed computing platform 102, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout for a volume where modified data for a file may be written to any available location as opposed to a write-in-place architecture where modified data is written to the original location, thereby overwriting the previous data.

In one or more embodiments, the file system may be implemented through a file system layer that stores data of the storage objects in an on-disk format representation that is block-based (e.g., data may be stored within 4 kilobyte blocks). Pointer elements may be used to identify files and file attributes such as creation time, access permissions, size and block location, other types of attributes, or a combination thereof. Such pointer elements may be referred to as index nodes (inodes). For example, an inode may be a data structure that points to a file system object (e.g., a file, a folder, or a directory) in the file system. The inode may point to blocks that make up a file and may also contain the metadata of the file. In some cases, an inode may itself have a certain capacity and may be able to store a file itself. As one example, the inode may have a 288-byte capacity and may be capable of storing a file that is less than 64 bytes. In one or more embodiments, a given volume may have a finite number of inodes.

In one or more embodiments, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In one or more embodiments, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In one or more embodiments, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the computing environment 100, such as between the first node 130 of the first cluster 136 and the third node 134 of the second cluster 138 and/or between a node of a cluster and an instance of a node or virtual machine in the distributed computing platform 102.

For example, during synchronous replication, the first node 130 may receive a write operation from the client node 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client node 128 for the write operation until the write operation is executed upon the volume and the first node 130 receives the success message that the second node 132 executed the replicated write operation upon the replica volume.

In other embodiments, asynchronous replication may be implemented, such as between the first node 130 and the third node 134. It may be appreciated that the synchronization module may implement asynchronous replication between any devices within the computing environment 100, such as between the first node 130 of the first cluster 136 and the distributed computing platform 102. In an example, the first node 130 may establish an asynchronous replication relationship with the third node 134. The first node 130 may capture a baseline snapshot of a first volume as a point in time representation of the first volume. The first node 130 may utilize the baseline snapshot to perform a baseline transfer of the data within the first volume to the third node 134 in order to create a second volume within the third node 134 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume.

In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In one or more embodiments, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service datastore 120. Further, the data storage tier 108 may store client specific data within client data stores assigned to such clients such as a client (1) datastore 122 used to store data of a client (1) and a client (N) datastore 124 used to store data of a client (N). The data stores may be physical storage devices or may be defined as logical storage, such as a virtual volume, logical unit numbers (LUNs), or other logical organizations of data that can be defined across one or more physical storage devices. In another example, the first node 130 transmits and stores all client data to the distributed computing platform 102. In yet another example, the client node 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client node 128, within the first node 130, or within the distributed computing platform 102 such as by the application server tier 106. In another example, one or more SVMs may be hosted across one or more of the client node 128, the first node 130, and the distributed computing platform 102. The one or more SVMs may host instances of the storage operating system.

In one or more embodiments, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (ISCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) datastore 122. Thus, an SVM executing on the server (1) 116 may receive data and/or operations from the client node 128 and/or the first node 130 over the network 126. The SVM executes a storage application and/or an instance of the storage operating system to process the operations and/or store the data within the client (1) datastore 122. The SVM may transmit a response back to the client node 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client node 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client node 128 and/or the first node 130 may subscribe to certain types and amounts of services and resources provided by the distributed computing platform 102. For example, the client node 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client node 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of computing devices include, but are not limited to, personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of networks include, but are not limited to, networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, which may be implemented using a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service datastore 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
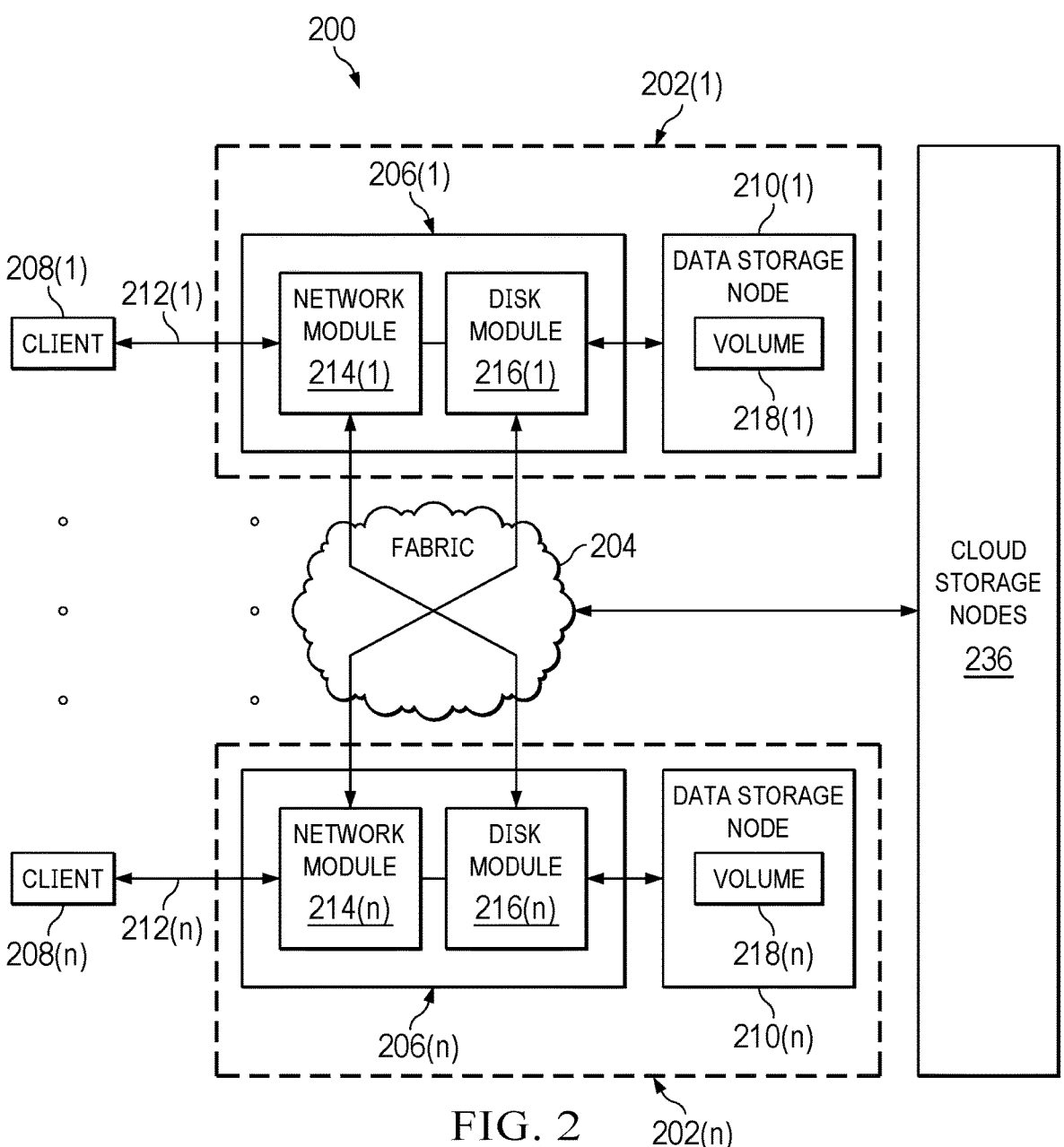
FIG. 2 is a schematic diagram illustrating a network environment in accordance with one or more example embodiments.

FIG. 2 is a schematic diagram illustrating a network environment 200 in accordance with one or more example embodiments. The network environment 200 illustrates another architecture for the principles described above with respect to Fig. The network environment 200, which may take the form of a clustered network environment, includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n) (also referred to as node computing devices), for example), although any number of other elements or components can also be included in the network environment 200 in other examples. This technology provides a number of advantages including methods, non-transitory computer-readable media, and computing devices that implement the techniques described herein.

In this example, node computing devices 206(1)-206(n) can be primary or local storage controllers or secondary or remote storage controllers that provide client devices 208(1)-208(n) (also referred to as client nodes) with access to data stored within data storage nodes 210(1)-210(n) (also referred to as data storage devices) and cloud storage node(s) 236 (also referred to as cloud storage device(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage nodes 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage node(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage nodes 210(1)-210(n) in the event a disaster occurs at a disaster storage site (e.g., the node computing device 206(1) provides client device 208(n) with switchover data access to data storage nodes 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the network connections 212(1)-212(n), for example, allowing the client devices 208(1)-208(n) to access data stored in the network environment 200.

Further, the network modules 214(1)-214(n) can provide connections with one or more other components through the cluster fabric 204. For example, the network module 214(1) of node computing device 206(1) can access the data storage node 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage node 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage nodes 210(1)-210(n), such as disks or arrays of disks, SSDs, flash memory, or some other form of data storage, to the node computing devices 206(1)-206(n). Often, disk modules 216(1)-216(n) communicate with the data storage nodes 210(1)-210(n) according to the SAN protocol, such as SCSI or FCP, for example, although other protocols can also be used. Thus, as seen from an operating system on node computing devices 206(1)-206(n), the data storage nodes 210(1)-210(n) can appear as locally attached. In this manner, different node computing devices 206(1)-

206(*n*), etc. may access data blocks, files, or objects through the operating system, rather than expressly requesting abstract files.

While the network environment 200 illustrates an equal number of network modules 214(1)-214(*n*) and disk modules 216(1)-216(*n*), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(*n*) can be networked with the node computing devices 206(1)-206(*n*) in the cluster, over the network connections 212(1)-212(*n*). As an example, respective client devices 208(1)-208(*n*) that are networked to a cluster may request services (e.g., exchanging of information in the form of data packets) of node computing devices 206(1)-206(*n*) in the cluster, and the node computing devices 206(1)-206(*n*) can return results of the requested services to the client devices 208(1)-208(*n*). In one example, the client devices 208(1)-208(*n*) can exchange information with the network modules 214(1)-214(*n*) residing in the node computing devices 206(1)-206(*n*) (e.g., network hosts) in the data storage apparatuses 202(1)-202(*n*).

In one example, the data storage apparatuses 202(1)-202(*n*) host aggregates corresponding to physical local and remote data storage devices, such as local flash or disk storage in the data storage nodes 210(1)-210(*n*), for example. One or more of the data storage nodes 210(1)-210(*n*) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(*n*) in this example, although any number of volumes can be included in the aggregates. The volumes 218(1)-218(*n*) are virtual data stores or storage objects that define an arrangement of storage and one or more filesystems within the network environment 200. Volumes 218(1)-218(*n*) can span a portion of a disk or other storage device, a collection of disks, or portions of disks, for example, and typically define an overall logical arrangement of data storage. In one example, volumes 218(1)-218(*n*) can include stored user data as one or more files, blocks, or objects that may reside in a hierarchical directory structure within the volumes 218(1)-218(*n*).

Volumes 218(1)-218(*n*) are typically configured in formats that may be associated with particular storage systems, and respective volume formats typically comprise features that provide functionality to the volumes 218(1)-218(*n*), such as providing the ability for volumes 218(1)-218(*n*) to form clusters, among other functionality. Optionally, one or more of the volumes 218(1)-218(*n*) can be in composite aggregates and can extend between one or more of the data storage nodes 210(1)-210(*n*) and one or more of the cloud storage node(s) 236 to provide tiered storage, for example, and other arrangements can also be used in other examples.

In one example, to facilitate access to data stored on the disks or other structures of the data storage nodes 210(1)-210(*n*), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 210(1)-210(*n*) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 210(1)-210(*n*) can have one or more physical ports, wherein each physical port can be assigned a target address (e.g., SCSI target address). To represent respective volumes, a target address on the data storage nodes 210(1)-210(*n*) can be used to identify one or more of the LUNs. Thus, for example, when one of the node computing devices 206(1)-206(*n*) connects to a volume, a connection between the one of the node computing devices 206(1)-206(*n*) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

The present embodiments may be implemented using hardware, software, firmware, or a combination thereof. Accordingly, it is understood that any operation of the computing systems of the computing environment 100, the network environment 200, or both may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

III. Exemplary Architecture for Write-Back Caching

Figure 3:
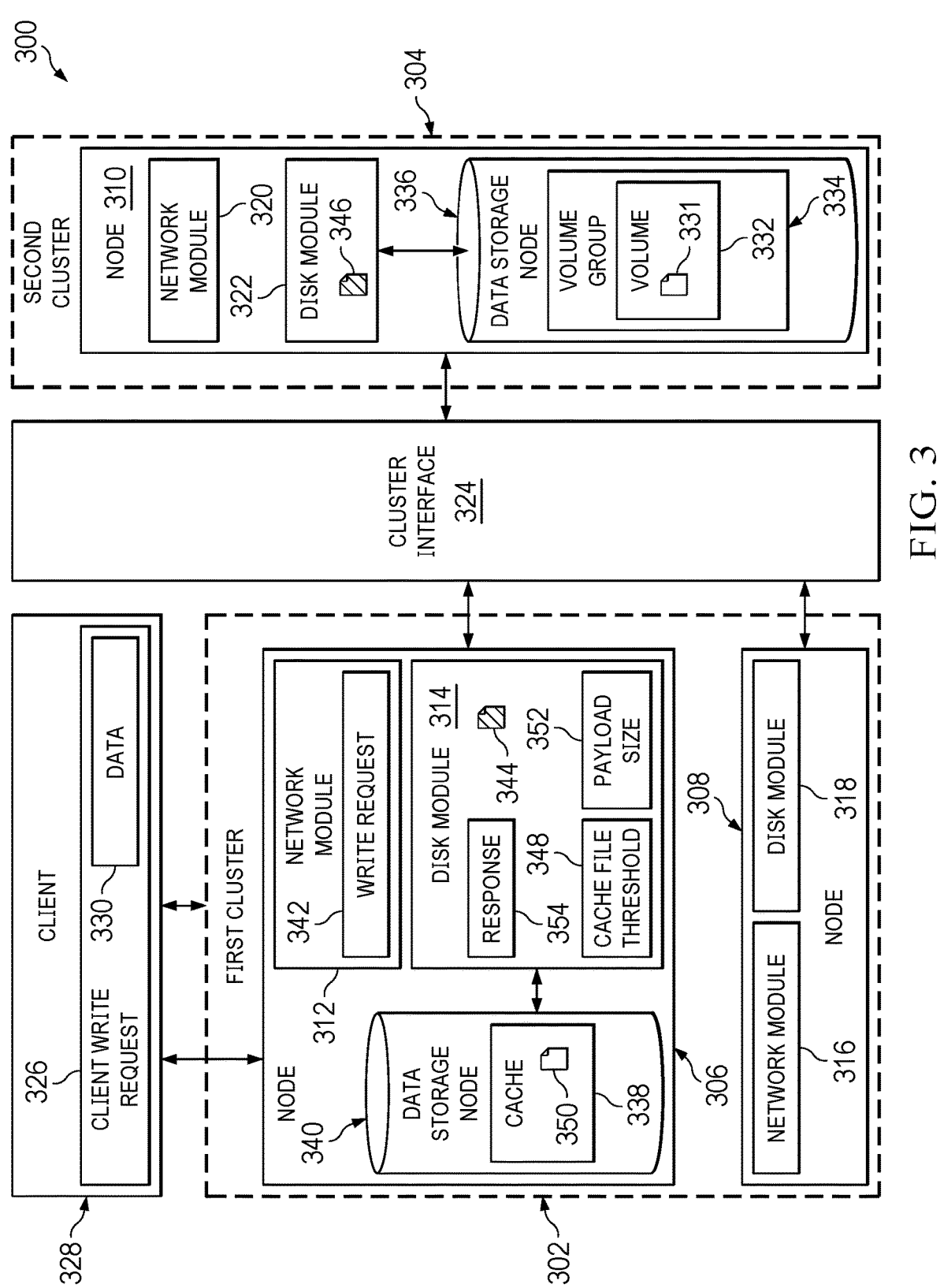
FIG. 3 is a schematic block diagram illustrating a cluster environment in accordance with one or more example embodiments.

FIG. 3 is a schematic block diagram illustrating a cluster network 300 in accordance with one or more example embodiments. The cluster network 300 may be one example of an implementation for network environment 200 in FIG. 2 and further illustrates another architecture for the principles described above with respect to FIG. 1. The cluster network 300 includes a plurality of clusters that includes, for example, a first cluster 302 and a second cluster 304. Each of these clusters may be implemented in a manner similar to the clusters described with respect to FIG. 1. For example, each of the first cluster 302 and the second cluster 304 may be implemented in a manner similar to cluster 136, cluster 138, or another cluster in the computing environment 100 in FIG. 1.

Each of these clusters may include one or more nodes. In one or more embodiments, the first cluster 302 includes node 306 and node 308 and the second cluster 304 includes node 310. These nodes may be implemented in a manner similar to the nodes described with respect to FIG. 1 (e.g., the first node 130, the second node 132, the third node 134, etc.). In one or more embodiments, each of node 306, node 308, and node 310 may be examples of implementations for the node computing devices 206(1)-206(n) in FIG. 2.

Node 306, node 308, and node 310 may each include a network module, a disk module, or both. In one or more embodiments, node 306 includes a network module 312 and a disk module 314; node 308 includes a network module 316 and a disk module 318; and node 310 includes a network module 320 and disk module 322.

Each of network module 312, network module 316, and network module 320 enables communication with one or more clients via network connections (e.g., network connections 212(1)-212(n) described with respect to FIG. 2). Further, each of network module 312, network module 316, and network module 320 can communicate with the disk module of its same node or the disk module of one or more other nodes in its own cluster over a cluster interface 324. For example, network module 316 may be capable of communicating with disk module 318 and with disk module 322. Cluster interface 324 may include one example of an implementation for cluster fabric 204 in FIG. 2. In one or more embodiments, cluster interface 324 may use one or more logical interfaces to establish connections between the nodes within a cluster, connections between the nodes in different clusters, or both. Cluster interface 324 may be also referred to as a cluster interconnect or a cluster switch.

In some cases, cluster interface 324 may include one or more separate intracluster interfaces for communications between nodes of the same cluster in addition to a main intercluster interface. Each of these various intracluster interfaces may include any number of logical interfaces that allow communications between the nodes of the corresponding cluster. For example, each of the first cluster 302 and the second cluster 304 may have a separate intracluster interface within cluster interface 324. In some cases, this separate intracluster interface may be considered part of the cluster with which it is associated.

In one or more embodiments, a client write request 326 is received at the first cluster 302 (e.g., over a network such as network 126 in FIG. 1). The client write request 326 is a request that originates from a client 328 to write data 330 to a selected file 331 of a volume 332. For example, the client 328 may be given access to the contents of the volume 332.

The client 328 may be able to select which of the files in the volume 332 that will be the selected file 331 to which data 330 is written.

The volume 332 may be stored on data storage node 336, which is one example of an implementation for one of data storage nodes 210(1)-210(n). The volume 332 may be one example of an implementation for one of volumes 218(1)-218(n). Node 306 provides access to the data stored on volume 332. The selected file 331 may be, for example, a file of a write-anywhere-file-layout file system. In one or more embodiments, the data storage node 336 is managed by node 310 in the second cluster 304. For example, node 310 provides access to the data storage node 336 and thereby the volume 332.

The volume 332 is associated with a corresponding cache 338. This cache 338 may correspond to volume 332 by being associated one-to-one with volume 332 or by being associated with volume group 334 that includes volume 332. The cache 338 provides a temporary storage location that is located between the client 328 and a data storage node 336. In the read context, the cache 338 may reduce read latency by allowing data to be served faster than would be otherwise possible by fetching the data directly from the source, the volume 332 on the data storage node 336. In the write context, the cache 338 may reduce write latency by allowing the writing of data to be completed and confirmed to the client 328 faster than directly writing the data to the volume 332.

The client 328 may mount the volume 332 (or the volume group 334 that includes the volume 332) or cache 338 depending on the needs of the client 328. For example, the client 328 may be located remotely with respect to the data storage node 336 and may mount the cache 338 to reduce overall read and/or write latency and increase overall throughput. In one or more examples, the client 328 determines which of the cache 338 or the volume 332 is "closer" to the client 328 and mounts the one that is closer. The "closer" of the volume 332 or the cache 338 may be the one that is physically located closer to the client 328 than the data storage node 336, the one that has a shorter data transmission time from the client 328 to it, or the one that belongs to a cluster that is closer to the client 328 than the cluster to which the other belongs.

In some cases, the client 328 is unaware of whether the volume 332 or the cache 338 has been mounted. For example, the client 328 may simply see that the files and folders of the volume 332 are available for reading or writing. In other cases, the client 328 may be allowed to select the cache 338 or the volume 332 for mounting. The client write request 326 identifies whether the cache 338 or the volume 332 (or the volume group 334) has been mounted to the client 328.

The cache 338 may be stored on a data storage node 340, which is one example of an implementation for one of data storage nodes 210(1)-210(n). The cache 338 may be hosted by for example, node 306. More specifically, the cache 338 may be hosted by the disk module 314 of the node 306. In other words, the disk module 314 provides access to the data storage node 340, and thereby the cache 338.

In one or more embodiments, the client write request 326 is received by the network module 312 of node 306. In response to receiving the client write request 326 from the client 328, the network module 312 determines whether the operation is for the volume 332 or the cache 338 based on the information included in the client write request 326. The network module 312 processes the client write request 326 to form a write request 342 that can be sent out to the disk module 314. This write request 342 is generated in a format that can be readily processed by the disk module 314 or any other disk module of a node in the cluster network 300.

In one or more embodiments, the network module 312 may send out a query to determine whether the underlying volume 332 to which the write is to occur is write-back enabled. For example, a persistent RAID level write-back flag may be set on the volume 332. When the volume 332 is part of the volume group 334, the persistent RAID level write-back flag may be set on each of the volumes included in the volume group 334. If the network module 312 determines that the underlying volume 332 is not write-back enabled, the network module 312 forwards the write request 342 to the disk module 322 at the node 310 hosting the volume 332. The data 330 is then directly written to the volume 332 without first being written to cache 338.

If, however, the network module 312 determines that the underlying volume 332 is write-back enabled, the network module 312 forwards the write request 342 to the disk module 314 of node 306 hosting the cache 338. The disk module 314 determines whether the cache 338 has an active (not revoked) write delegation for the selected file 331 identified in the write request 342. A write delegation prevents other processes (e.g., other processes operating within node 306, other client processes operating at the client 328 or another client, other processes operating at a different node in the first cluster 302, and other processes operating at a different cluster (e.g., second cluster 304)) from at least writing to the selected file 331 until the write delegation of the cache 338 is revoked. This write delegation may be the write portion of a read-write delegation. A read-write delegation prevents other processes reading from and writing to the cache 338 until the read-write delegation has been revoked. In some cases, a write delegation may be a delegation separate from a read delegation. A write delegation for the selected file 331 may be revoked when a client process or other process attempts to access the same selected file 331.

The statuses of write delegations (and/or read-write delegations) are tracked in a cache metafile 344. For example, the cache metafile 344 may track when a write delegation has been granted and when a write delegation has been revoked. In some cases, the cache metafile 344 may simply track any write delegation that has been granted to the cache 338 and that is active (not revoked). The disk module 314 determines whether the cache 338 has the active write delegation for the selected file 331 based on the information in the cache metafile 344.

If the cache 338 does not have an active write delegation for the selected file 331, the disk module 314 requests the write delegation for the selected file 331 to allow the cache 338 exclusive access to the selected file 331. This request is sent to the disk module 322 of the node 310 that is hosting the volume 332 over the cluster interface 324. The disk module 322 processes the delegation request, grants the request, and generates an entry in its volume metafile 346. The volume metafile 346 may correspond to the volume 332 or to the volume group 334. The volume metafile 346 is used to track which caches have been granted write delegations (and/or read-write delegations). The disk module 322 of node 310 sends a response back to the disk module 314 of node 306 indicating that the write delegation has been granted.

Once the disk module 314 has obtained the write delegation, the cache 338 determines whether processing the write request 342 will cause a cache file threshold 348 to be met (e.g., reached or exceeded) for an amount of accumulated data in a cache file 350 in the cache 338 that corresponds to the selected file 331. The cache file threshold 348 for the amount of accumulated data in the cache file 350 may be set to allow multiple write requests for the selected file 331 to be processed before a write-back of the accumulated data in the cache file 350 is initiated. In one or more embodiments, the cache file threshold 348 is set to a value between 64 kilobytes and 10 gigabytes. For example, the cache file threshold 348 may be set to a value of 1, 2, 3, 4, 5, 6, 7, 8, 9, or 10 gigabytes. In some cases, the cache file threshold 348 is set to a default value (e.g., 500 kilobytes, 800 kilobytes, 1 megabytes, 5 megabytes, etc.). In other embodiments, the cache file threshold 348 is set to a value between 1 gigabyte and 110 gigabytes. In some cases, the cache file threshold 348 may be set to a percentage of the overall size of cache file 350.

In one or more embodiments, a network administrator may adjust the cache file threshold 348 based on performance requirements for the workloads managed by the network administrator. For example, a network administrator, being unable to predict the size of the write requests that will be received, may set the cache file threshold 348 for the amount of accumulated data to a value that is just greater than (e.g., a value within a selected number of data blocks, bytes, kilobytes, etc. of) the maximum file size that can be written. In some embodiments, the maximum file size may also be tunable by the network administrator. In one or more embodiments, a network administrator may adjust the cache file threshold 348 based on performance requirements for the workloads managed by the network administrator. A network administrator may adjust the cache file threshold 348 based on different expected workloads such that different, typical workloads can have different recommended threshold. In some cases, the cache file threshold 348 may be set (e.g., automatically or by the network administrator) based on observed workloads over time. In In one or more embodiments, the cache file threshold 348 may be set or adjusted automatically (e.g., by the disk module 314) based on observed workloads, performance requirements, one or more predefined rules, one or more criteria being met, or a combination thereof.

The disk module 314 determines whether the cache file threshold 348 has been met by consulting the cache metafile 344. The cache metafile 344 may track, for example, without limitation, the amount of accumulated data in the cache file 350, the amount of accumulated data in the cache 338, the amount of time that has been elapsed since a modification (e.g., write) has occurred for each cache file in the cache 338, or a combination thereof. In one or more embodiments, the amount of time that has been elapsed since a modification (e.g., write) has occurred for each cache file in the cache 338 is stored in the inode associated with the cache file.

If the cache file threshold 348 has not been met, the disk module 314 processes the write and the data 330 is written to the cache file 350. The disk module 314 stores information about the write in the cache metafile 344. For example, the size of the write may be tracked via the cache metafile 344. The time at which the data 330 is written to the cache file 350 may be tracked using the inode associated with the cache.

If, however, the cache file threshold 348 will be met, the disk module 314 initiates a write-back of the accumulated data in the cache file 350 to the selected file 331 on the volume 332. Once the write-back has been completed, the disk module 314 is free to process the write request 342 as described above.

During a write-back initiated based on the cache file threshold 348 being met, the disk module 314 flushes the cache file 350. The write-back operation is performed by sending write-back messages to the disk module 322 on node 310 hosting the volume 332. The payload size 352 of these write-back messages may be a tunable parameter specific to the cache 338. For example, to reduce write-back chatter between the disk module 314 and the disk module 322, the payload size 352 may be increased to allow for data to be transmitted from the cache 338 via disk module 314 to the volume 332 via disk module 322. In one or more embodiments, the payload size 352 is set to a value between 64 kilobytes (e.g., 16 data blocks) and 960 kilobytes (240 blocks). In other embodiments, the payload size 352 is set to a value between 64 kilobytes (e.g., 16 data blocks) and 100 megabytes (e.g., 25,000 data blocks). In some examples, the payload size 352 is set to a default value (e.g., 500 kilobytes, 800 kilobytes, 1000 kilobytes, 1200 kilobytes, 2 megabytes, etc.). In some cases, the minimum for the payload size 352 is the minimum possible size of a write request that can received at the disk module 314.

In one or more embodiments, the cache file threshold 348, the payload size 352, or both are stored as properties of the underlying volume 332. For example, the cache file threshold 348, the payload size 352, or both may be stored as RAID level properties for the underlying volume 332. In other embodiments, the cache file threshold 348, the payload size 352, or both may be stored in the cache metafile 344. In some embodiments, the cache file threshold 348, the payload size 352, or both may be stored in a separate file managed by disk module 314.

After the data 330 has been written to the cache 338, the disk module 314 generates and sends a response 354 to the client 328 via the network module 312. The response confirms that the write has been completed. Using cache 338 reduces the write latency, which may be, for example, the time between when the client write request 326 was received from the client 328 and when the response 354 is sent to the client 328. Further, using cache 338 increases throughput.

Figure 4:
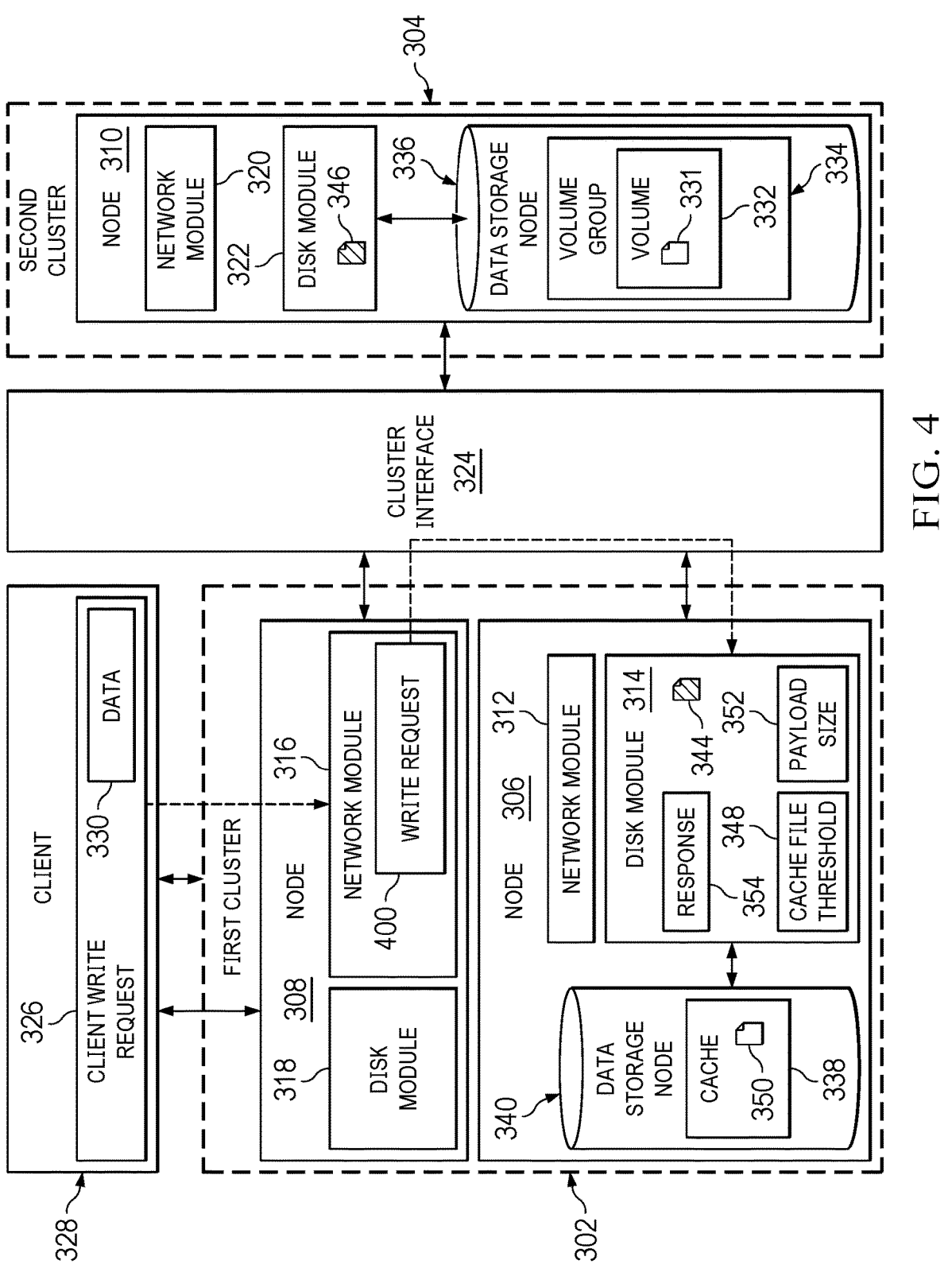
FIG. 4 is another schematic block diagram for a cluster environment in which the client write request is received by a different node in accordance with one or more example embodiments.

FIG. 4 is another schematic block diagram for the cluster network 300 from FIG. 3 in which the client write request is received by a different node in accordance with one or more example embodiments. In FIG. 4, the client write request 326 is received by the network module 316 of node 308. In response to receiving the client write request 326 from the client 328, the network module 316 processes the client write request 326 to form a write request 400. This write request 400, similar to the write request 342 generated in FIG. 3, is generated in a format that can be readily processed by any of the disk modules in the nodes of cluster network 300. The network module 316 may identify, for example, that the operation is for the cache 338 that is being hosted by node 306. The network module 316 sends the write request 400 to the disk module 314 of node 306. The disk module 314 then processes the write request 400 in a manner similar to that described for the write request 342 in FIG. 2.

Figure 5:
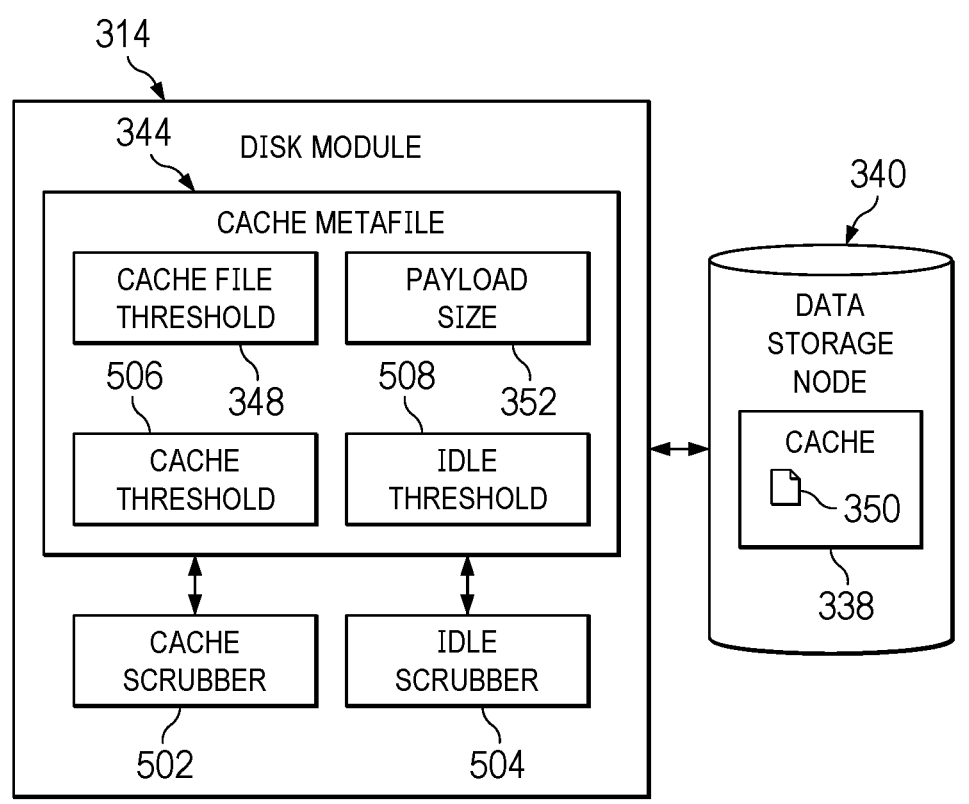
FIG. 5 is a schematic block diagram of the disk module of a node described in greater detail in accordance with one or more example embodiments.

FIG. 5 is a schematic block diagram of the disk module 314 of node 306 from FIGS. 3-4 described in greater detail in accordance with one or more example embodiments. The disk module 314 may include a cache scrubber 502 and an idle scrubber 504. Each of these scrubbers may be implemented using hardware, software, or a combination thereof. Each of these scrubbers may be implemented using one or more processes operating within the disk module 314.

The cache scrubber 502 uses the cache metafile 344 to track the total amount of data being stored in the cache 338 as a result of reads and writes. The cache scrubber 502 determines whether a cache threshold 506 for the amount of accumulated data in the cache 338 has been met (e.g., reached or exceeded). The cache threshold 506 for the amount of accumulated data in the cache 338 may be set to ensure that the cache 338 does not end up with an overly large amount of data that has yet to be written back. This type of accumulation may happen, for instance, when individual writes are smaller than the cache file threshold 348 described above with respect to FIGS. 3-4. In one or more embodiments, the cache threshold 506 may be set to a value between 1 megabyte and 10 terabytes. For example, the cache threshold 506 may be set to a value of 1 megabyte, 10 megabytes, 100 megabytes, 1 gigabyte, 10 gigabytes, 100 gigabytes, 1 terabyte, 10 terabytes, or some other number. In some cases, the cache threshold may be set to a default value (e.g., 6 gigabytes, 8 gigabytes, 10 gigabytes, etc.). The cache threshold 506 may be set in units of bytes (e.g., megabytes, gigabytes, terabytes, etc.) or data blocks. In one or more embodiments, cache threshold 506 is set to a value that is smaller than cache file threshold 348 to ensure that the operation of cache scrubber 502 does not interfere with operations being performed based on cache file threshold 348. In some cases, the cache threshold 506 may be set to a percentage of the overall size of the cache 338.

In response to determining that the cache threshold 506 for the amount of accumulated data in the cache 338 has been met, the cache scrubber 502 initiates a write-back of the accumulated data in the cache 338. In one or more embodiments, the cache scrubber 502 initiates a write-back of all entries in the cache 338. In other embodiments, the cache scrubber 502 initiates a write-back of a selected portion of the cache 338 (e.g., the cache files with the oldest write times).

The idle scrubber 504 is set to determine whether any cache files have been idle for at least a selected idle threshold 508. The idle threshold 508 may be a threshold for an amount of time that a cache file (e.g., cache file 350 in FIGS. 3-4) has been left idle. A cache file is considered idle when it is not being modified. For example, a cache file is idle when no data is being written to that cache file. The idle threshold 508 may be set to a value between, for example, 30 seconds and 10 minutes. In some cases, the idle threshold 508 may be set to a default value (e.g., 1 minute, 2 minutes, 3 minutes, 5 minutes, etc.). The idle scrubber 504 may use the cache metafile 344 to determine the idle times for the cache files in the cache 338.

If the idle scrubber 504 determines that one or more cache files in the cache 338 have met the idle threshold 508, these cache files are then flushed. In particular, the idle scrubber 504 initiates a write-back of the accumulated data in these particular cache files. In some embodiments, the idle scrubber 504 is set to make its determination at a selected interval 510. The selected interval may be, for example, a value between 1 minute and 30 minutes. The selected interval may be set to a default value (e.g., 2 minutes, 3 minutes, 5 minutes, 8 minutes, etc.).

In some embodiments, the cache scrubber 502, the idle scrubber 504, or both may be permitted to run on-demand. For example, the disk module 314 can send a command to trigger the cache scrubber 502 to flush out all entries of the cache 338. As another example, the disk module 314 can send a command to trigger the idle scrubber 504 to flush out any cache files that have met the idle threshold 508. In one or more embodiments, the cache scrubber 502, the idle scrubber 504, or both may be implemented as processes (e.g., programming threads) inside the file system. In other embodiments, the cache scrubber 502, the idle scrubber 504, or both may be implemented as processes (e.g., programming threads) outside the file system. For example, the idle scrubber 504 may be implemented as a process outside the file system (e.g., via a management host with the process running parallel to the file system). In some cases, implementing the idle scrubber 504, the cache scrubber 502, or both outside the file system may reduce the amount of computing resources used, improve scheduling capabilities, or both.

The cache threshold 506 and the idle threshold 508 may be tunable parameters. In one or more embodiments, a network administrator may adjust these thresholds based on performance requirements for the workloads managed by the network administrator. A network administrator may adjust the thresholds based on different expected workloads such that different, typical workloads can have different recommended thresholds. In some cases, these thresholds may be set (e.g., by the network administrator or automatically) based on observed workloads over time. In one or more embodiments, the thresholds may be set or changed automatically based on observed workloads, performance requirements, one or more predefined rules, one or more criteria being met, or a combination thereof.

In one or more embodiments, the cache file threshold 348, the payload size 352, the cache threshold 506, the idle threshold 508, or a combination thereof are stored as properties of the underlying volume 332. For example, the cache file threshold 348, the payload size 352, the cache threshold 506, the idle threshold 508, or a combination thereof may be stored as RAID level properties for the underlying volume 332.

In other embodiments, the cache file threshold 348, the payload size 352, the cache threshold 506, the idle threshold 508, or a combination thereof are stored in cache metafile 344. In some embodiments, the cache file threshold 348, the payload size 352, the cache threshold 506, the idle threshold 508, or a combination thereof are stored in a separate file or metafile managed by disk module 314. In other embodiments, the cache file threshold 348, the payload size 352, the cache threshold 506, the idle threshold 508, or a combination thereof are stored in one or more separate files in data storage node 340. Thus, each of the cache file threshold 348, the payload size 352, the cache threshold 506, and the idle threshold 508 may be independently stored in different ways for use by the disk module 314.

The description of computing environment in FIGS. 1-3 are not meant to imply physical or architectural limitations to the manner in which the various embodiments described herein may be implemented. Other components in addition to or in place of the ones illustrated may be used. Some components may be optional.

Further, the functionalities described above with respect to network module 312 and disk module 314 in FIG. 3 may be similarly applicable to network module 316 and disk module 318, respectively, and to network module 320 and disk module 322, respectively. For example, disk module 322 may be able to perform write-back caching functions in a manner similar to disk module 314.

IV. Exemplary Methodologies for Write-Back Caching

FIG. 6 is a flow diagram of a process 600 for write-back caching in accordance with one or more example embodiments. The process 600 may be implemented by one or more processors executing computer-readable instructions (e.g., from one or more computer-readable media) to perform the functions described herein. The process 600 may be implemented using one or more processors in a node in a cluster such as, for example, first node 130, second node 132, or third node 134 in FIG. 1. In some cases, the process 600 may be implemented by one or more processors of a data storage apparatus, such as, for example, one of the data storage apparatuses 202(1)-202(n) described in connection with FIG. 2. In one or more embodiments, the process 600 may be implemented by one or more processors of a node such as, for example, node 306 in FIGS. 3-4. Further, the process 600 may be implemented by, for example, disk module 314 in FIGS. 3-5, disk module 318 in FIGS. 3-4, and/or disk module 322 in FIGS. 3-4.

Operation 602 includes receiving, within a first node, a write request to write data to a volume that is hosted by a second node. In one or more embodiments, the first node is in a first cluster and the second node is in a second cluster that is different from the first cluster. In other embodiments, the first node and the second node belong to the same cluster. The first node may be, for example, node 306 in FIGS. 3-4. The second node may be, for example, node 310 in FIGS. 3-4 (or alternatively, node 308 in FIGS. 3-4).

The write request originates from a client. For example, the write request may be a modified (or transformed) version of a client write request that originates from the client. The client may be, for example, client 328 in FIGS. 3-4. In some embodiments, the client write request is received from the client at a network module of a node. This node may be the first node or a different node. The network module processes the client write request to generate the write request, which is then sent to the disk module of the first node. This write request may be, for example, write request 342 in FIG. 3 or write request 400 in FIG. 4. The disk module may be, for example, disk module 314 in FIGS. 3-5.

In one or more embodiments, the write request may be a request to write data to one or more selected files on the volume. For example, the write request may be to write a discrete amount of data to a selected file on the volume. The selected file and volume may be, for example, the selected file 331 and the volume 332, respectively, in FIGS. 3-4. In one or more embodiments, the client selects the file from the volume for writing data without being aware of whether the volume or its corresponding cache has been mounted to the client. In some embodiments, the client may be aware of whether the volume or the corresponding cache is mounted but the volume contents are presented to the client in the same way regardless of which is mounted.

Operation 604 includes writing the data to a cache that corresponds to the volume and that is hosted by the first node. The data is written in data blocks of the cache. In one or more embodiments, the data is written to a cache file in the cache that corresponds to the selected file. The cache file may correspond to the selected file to the selected file by being designated for storing portions of data to be read from or written to the selected file with reduced read latency or write latency, respectively. For example, data that is written to the cache file is designated for being written to the selected file.

Operation 606 includes sending a response to the client after the data is written to the cache. The response confirms that the write operation has been completed. Writing the data to the cache prior to the data being written to the volume reduces the write latency associated with the write request because the overall time it takes to the write the data to the cache is less than the overall time it takes to write the data directly to the volume. Further, the time it takes to confirm that the write has been completed is reduced.

Operation 608 includes initiating a write-back of accumulated data in the cache to the volume hosted by the second node when at least one of a cache file threshold, a cache threshold, or an idle threshold is met. The write-back includes writing the accumulated data in the cache to the volume and flushing the accumulated data that has been written back from the cache. Initiating the write-back may include, for example, without limitation, generating and sending a command to begin writing the accumulated data in the cache to the volume, beginning the writing back of the accumulated data in the cache to the volume, or both.

The writing of the accumulated data from the cache to the volume may be performed in various ways. For example, in operation 608, some or all of the accumulated data in the cache may be written back to the volume hosted by the second node. In one or more embodiments, the write-back may occur in two or more stages. In some embodiments, the write-back may include writing all accumulated data in the cache file to the volume and optionally, some or all of other the accumulated data in the cache to the volume. In some cases, the write-back may include writing accumulated data that is in the cache but not in the cache file to the volume (e.g., where the cache threshold has been met but the cache file threshold has not been met). The write-back may include writing back to the volume, for example, the oldest data in the cache or data that was written in the cache prior to a selected time. This selected time may be, for example, without limitation, 30 seconds, 1 minute, 2 minutes, 3 minutes, 4 minutes, 5 minutes, 10 minutes, 20 minutes, or some other amount of time between 15 seconds and 1 hour prior to the current write operation.

The cache file threshold, the cache threshold, and the idle threshold may be, for example, the cache file threshold 348 in FIGS. 3-5, the cache threshold 506 in FIG. 5, and the idle threshold 508 in FIG. 5, respectively. The cache file threshold for the amount of accumulated data in the cache file may be set to allow multiple write requests for the selected file to be processed before a write-back of the accumulated data in the cache file is initiated. In one or more embodiments, the cache file threshold is set to a value between 64 kilobytes and 10 gigabytes. For example, the cache file threshold may be set to a value of 1, 2, 3, 4, 5, 6, 7, 8, 9, or 10 gigabytes. In some cases, the cache file threshold is set to a default value (e.g., 500 kilobytes, 800 kilobytes, 1 megabytes, 5 megabytes, etc.). In some cases, the cache file threshold may be set to a percentage of the overall size of the cache file.

The cache threshold for the amount of accumulated data in the cache may be set to ensure that the cache does not end up with an overly large amount of data that has yet to be written back. This type of accumulation may happen, for instance, when individual writes are smaller than the cache file threshold. In one or more embodiments, the cache threshold may be set to a value between 1 megabyte and 10 terabytes. For example, the cache threshold may be set to a value of 1 megabyte, 10 megabytes, 100 megabytes, 1 gigabyte, 10 gigabytes, 100 gigabytes, 1 terabyte, 10 terabytes, or some other number. In some cases, the cache threshold may be set to a default value (e.g., 6 gigabytes, 8 gigabytes, 10 gigabytes, etc.). The cache threshold may be set in units of bytes (e.g., megabytes, gigabytes, terabytes, etc.) or data blocks. In some cases, the cache threshold may be set to a percentage of the overall size of the cache.

The idle threshold may be a threshold for an amount of time that a cache file has been left idle. A cache file is considered idle when it is not being modified. For example, a cache file is idle when no data is being written to that cache file. The idle threshold may be set to a value between, for example, 30 seconds and 10 minutes. In some cases, the idle threshold may be set to a default value (e.g., 1 minute, 2 minutes, 3 minutes, 5 minutes, etc.).

The cache file threshold, the cache threshold, and the idle threshold may be tunable parameters. For example, a network administrator may adjust these thresholds based on performance requirements for the workloads managed by the network administrator. A network administrator may adjust the thresholds based on different expected workloads such that different, typical workloads can have different recommended thresholds. In some cases, these thresholds may be set (e.g., by the network administrator or automatically) based on observed workloads over time. In one or more embodiments, these threshold may be set or adjusted automatically based on observed workloads, performance requirements, one or more predefined rules, one or more criteria being met, or a combination thereof.

In one or more embodiments, a network administrator may adjust the cache file threshold based on performance requirements for the workloads managed by the network administrator. For example, a network administrator, being unable to predict the size of the write requests that will be received, may set the cache file threshold for the amount of accumulated data to a value that is just greater than (e.g., a value within a selected number of data blocks, bytes, kilobytes, etc. of) the maximum file size that can be written. For example, if the maximum file size is 1000 kilobytes, the cache file threshold may be set to 1200 kilobytes.

FIG. 7 is a flow diagram of a process 700 for write-back caching in accordance with one or more example embodiments. The process 700 may be implemented by one or more processors executing computer-readable instructions (e.g., from one or more computer-readable media) to perform the functions described herein. The process 700 may be implemented using one or more processors in a node in a cluster such as, for example, first node 130, second node 132, or third node 134 in FIG. 1. In some cases, the process 700 may be implemented by one or more processors of a data storage apparatus, such as, for example, one of the data storage apparatuses 202(1)-202(n) described in connection with FIG. 2. In one or more embodiments, the process 700 may be implemented by one or more processors of a node such as, for example, node 306 in FIGS. 3-4. Further, the process 700 may be implemented by, for example, disk module 314 in FIGS. 3-5, disk module 318 in FIGS. 3-4, and/or disk module 322 in FIGS. 3-4.

Operation 702 includes receiving, within a first node, a write request to write data to a selected file on a volume that is hosted by a second node. In one or more embodiments, the first node is in a first cluster and the second node is in a second cluster that is different from the first cluster. In other embodiments, the first node and the second node belong to the same cluster. The first node may be, for example, node 306 in FIGS. 3-4. The second node may be, for example, node 310 in FIGS. 3-4 (or alternatively, node 308 in FIGS. 3-4).

The write request originates from a client. For example, the write request may be a modified (or transformed) version of a client write request that originates from the client. The client may be, for example, client 328 in FIGS. 3-4. In some embodiments, the client write request is received from the client at a network module of a node. This node may be the first node or a different node. The network module processes the client write request to generate the write request, which is then sent to the disk module of the first node. This write request may be, for example, write request 342 in FIG. 3 or write request 400 in FIG. 4. The disk module may be, for example, disk module 314 in FIGS. 3-5.

In operation 702, the selected file and volume may be, for example, the selected file 331 and the volume 332, respectively, in FIGS. 3-4. In one or more embodiments, the client selects the file from the volume for writing data without being aware of whether the volume or its corresponding cache has been mounted to the client. In some embodiments, the client may be aware of whether the volume or the corresponding cache is mounted but the volume contents are presented to the client in the same way regardless of which is mounted.

Operation 704 includes obtaining, for a cache that corresponds to the volume and that is hosted by the first node, a write delegation for the selected file to allow processing of the write request. The cache corresponds to the volume by being directly associated with the volume or with a volume group that includes the volume. The cache may be, for example, cache 338 in FIGS. 3-5. The cache resides between the client and the data storage node that stores the volume. For example, the cache may be physically located closer to the client than the data storage node. In some cases, the cache may reside "between" the client and the data storage node storing the volume by having a shorter data transmission time from the client to the cache as compared to from the client to the data storage node. In some cases, the cache may reside "between" the client and the data storage node by being in a cluster of nodes that is closer to the client than the cluster of nodes managing access to the data storage node.

The write delegation for the selected file grants the cache permission to write to the selected file. The write delegation may be part of a read-write delegation that also grants the cache permission to read from the selected file or may be a separate delegation from a read delegation. Further, the write delegation prevents other processes (e.g., other processes operating within the node, other client processes, other processes operating at a different node, and/or other processes operating at a different cluster, etc.) from accessing the selected file until the write delegation of the cache is revoked.

Operation 706 includes writing the data to a cache file in the cache that corresponds to the selected file. The cache file corresponds to the selected file by being designated for storing portions of data to be read from or written to the selected file with reduced read latency or write latency, respectively. For example, data that is written to the cache file is designated for being written to the selected file.

Operation 708 includes sending a response to the client after the data is written to the cache file. The response confirms that the write operation has been completed. Writing the data to the cache file prior to the data being written to the selected file of the volume reduces the write latency associated with the write request because the overall time it takes to the write the data to the cache file is less than the overall time it takes to write the data directly to the selected file of the volume. Further, the time it takes to confirm that the write has been completed is reduced.

Operation 710 includes initiating a write-back of accumulated data in the cache to the volume when at least one of a cache file threshold, a cache threshold, or an idle threshold is met. The cache file threshold, the cache threshold, and the idle threshold may be, for example, the cache file threshold 348 in FIGS. 3-5, the cache threshold 506 in FIG. 5, and the idle threshold 508 in FIG. 5, respectively. These thresholds may be implemented in a manner similar to the thresholds described in operation 608 in FIG. 6. In operation 710, all or only a portion of the accumulated data in the cache is written back to the volume.

FIG. 8 is a flow diagram of a process 800 for write-back caching in accordance with one or more example embodiments. The process 800 may be implemented by one or more processors executing computer-readable instructions (e.g., from one or more computer-readable media) to perform the functions described herein. The process 800 may be implemented using one or more processors in a node in a cluster such as, for example, first node 130, second node 132, or third node 134 in FIG. 1. In some cases, the process 800 may be implemented by one or more processors of a data storage apparatus, such as, for example, one of the data storage apparatuses 202(1)-202(n) described in connection with FIG. 2. In one or more embodiments, the process 800 may be implemented by one or more processors of a node such as, for example, node 306 in FIGS. 3-4. Further, the process 800 may be implemented by, for example, disk module 314 in FIGS. 3-5, disk module 318 in FIGS. 3-4, and/or disk module 322 in FIGS. 3-4.

Operation 802 includes receiving, at a first node, a write request to write data to a selected file on a volume that is hosted by a second node. In one or more embodiments, the first node is in a first cluster and the second node is in a second cluster that is different from the first cluster. In other embodiments, the first node and the second node belong to the same cluster. The first node may be, for example, node 306 in FIGS. 3-4. The second node may be, for example, node 310 in FIGS. 3-4 (or alternatively, node 308 in FIGS. 3-4). Operation 802 may be implemented in a manner similar to operations 602 and 702 in FIGS. 6 and 7, respectively.

Operation 804 includes obtaining a write delegation for the selected file to allow a cache corresponding to the volume exclusive access to the selected file. The cache may be hosted by the first node. Operation 804 may be implemented in a manner similar to operation 704 in FIG. 7.

Operation 806 includes determining whether a cache file threshold will be met by adding the data to the cache file. The cache file threshold is a threshold for an amount of accumulated data in a cache file on the cache, where the cache file corresponds to the selected file. The cache file threshold for the amount of accumulated data in the cache file may be set to allow multiple write requests for the selected file to be processed before a write-back of the accumulated data in the cache file is initiated. In one or more embodiments, the cache file threshold is set to a value between 64 kilobytes and 10 gigabytes. For example, the cache file threshold may be set to a value of 1, 2, 3, 4, 5, 6, 7, 8, 9, or 10 gigabytes. In some cases, the cache file threshold is set to a default value (e.g., 500 kilobytes, 800 kilobytes, 1 megabytes, 5 megabytes, etc.). In some cases, the cache file threshold may be set to a percentage of the overall size of the cache file.

If the cache file threshold will not be met, process 800 proceeds to operation 808 and then operation 810 described below; otherwise, process 800 proceeds to operation 814 described below.

Operation 808 includes writing the data to the cache file. Operation 810 includes sending a response to the client after the data is written to the cache file. This response confirms that the write has been completed.

Operation 814 includes initiating a write-back of the accumulated data in the cache file to the selected file on the volume, with the process 800 then proceeding to operation 808. In one or more embodiments, the write-back initiated in operation 814 may include writing all of the accumulated data in the cache file to the selected file on the volume and flushing (or clearing) the cache file.

In one or more embodiments, process 800 optionally includes performing operation 816 prior to performing operation 808 described above. Operation 816 includes determining whether a cache threshold will be met by adding the data to the cache file.

The cache threshold (e.g., cache threshold 506 in FIG. 5) for the amount of accumulated data in the cache may be selected to ensure that the cache does not end up with an overly large amount of data that has yet to be written back. This type of accumulation may happen, for instance, when individual writes are smaller than the cache file threshold. In one or more embodiments, the cache threshold may be set to a value between 1 megabyte and 10 terabytes. For example, the cache threshold may be set to a value of 1 megabyte, 10 megabytes, 100 megabytes, 1 gigabyte, 10 gigabytes, 100 gigabytes, 1 terabyte, 10 terabytes, or some other number. In some cases, the cache threshold may be set to a default value (e.g., 6 gigabytes, 8 gigabytes, 10 gigabytes, etc.). The cache threshold may be set in units of bytes (e.g., megabytes, gigabytes, terabytes, etc.) or data blocks. In some cases, the cache threshold may be set to a percentage of the overall size of the cache.

If the cache threshold will not be met, the process 800 proceeds to operation 808 as described above. If the cache threshold will be met, the process 800 proceeds to operation 818, which includes initiating a write-back of at least a portion of the accumulated data in the cache to the volume, with the process 800 then proceeding to operation 808 as described above. The write-back in operation 818 may include writing some or all of the accumulated data in the cache to the volume and flushing (or clearing) the respective portions of the cache.

Thus, in one or more embodiments, process 800 may include performing both the cache file threshold check in operation 806 and the cache threshold check in operation 816 prior to writing data to the cache file in operation 808. In some cases, operation 816 (cache threshold check) may be performed prior to operation 806 (cache file threshold check). In such cases, operation 806 (cache file threshold check) may be optionally omitted if the write-back in operation 818 is performed and if this write-back includes the flushing the cache file.

The new data may be written to the cache file in operation 808 after flushing of the cache ensures that writing the new data to the cache file will not cause either the cache file threshold for the cache file or the cache threshold for the cache to be exceeded. For example, in some cases, if the write-back in operation 814, the write-back in operation 818, or both are initiated, operation 808 may be performed only after these write-backs are completed.

In other embodiments, operation 808 may be initiated prior to the completion of a write-back. For example, if the write-back in operation 818 includes flushing the cache file as well as other portions of the cache, the writing the new data to the cache file in operation 808 may be performed once the cache file has been flushed, even if the rest of the cache has not yet finished being flushed. More particularly, the write in operation 808 may occur once the cache file has been flushed and once sufficient space within the cache has been made for the new data that is to be written. As another example, the writing of the new data to the cache file in operation 808 may be performed prior to an entirety of the accumulated data that is part of the write-back being written back to the volume and flushed from the cache. In this manner, the writing of the new data to the cache file in operation 808 may be performed even if the cache has not yet been fully flushed as long as there is both sufficient space within both the cache and cache file for the new data, as determined by the cache file threshold, the cache threshold, and the amount of the new data to be written.

Figure 9:
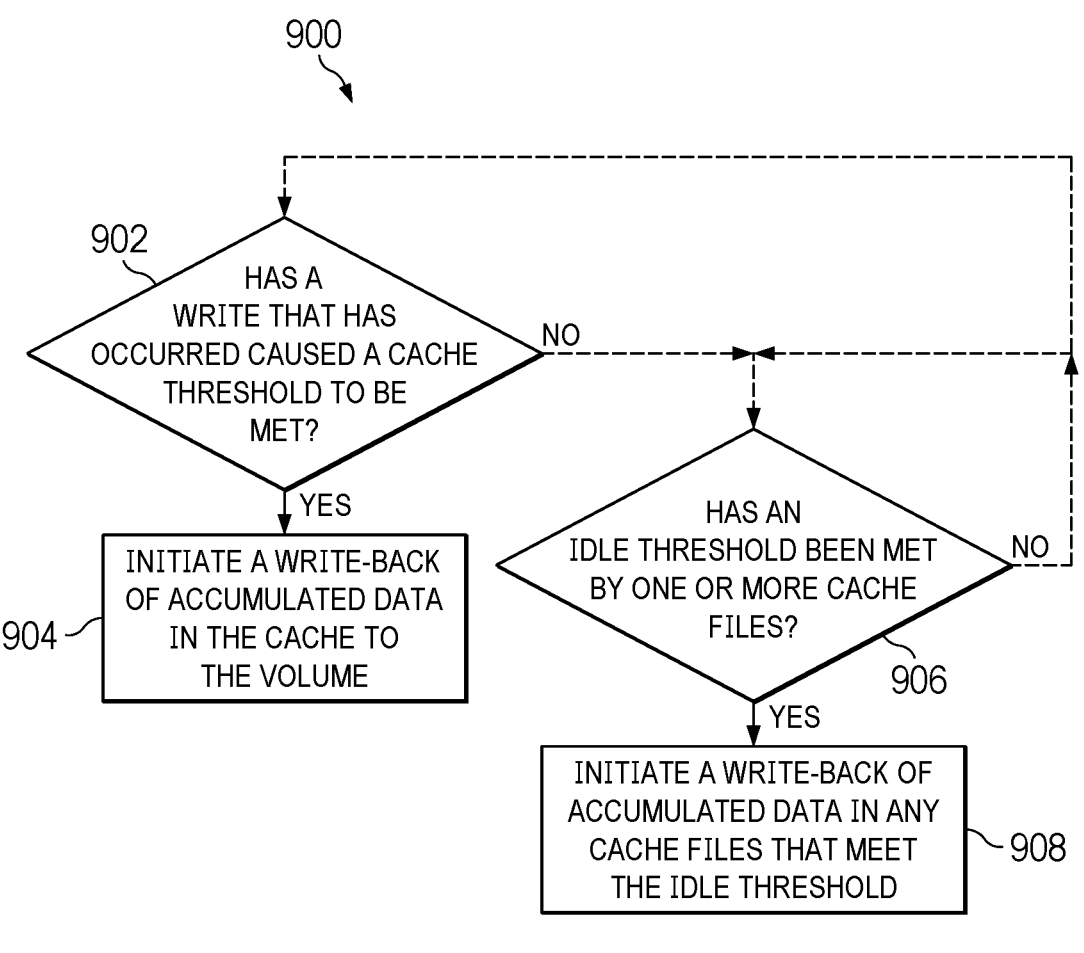
FIG. 9 is a flow diagram of a process for clearing at least a portion of a cache in accordance with one or more example embodiments.

FIG. 9 is a flow diagram of a process 900 for clearing at least a portion of a cache in accordance with one or more example embodiments. The process 900 may be implemented by one or more processors executing computer-readable instructions (e.g., from one or more computer-readable media) to perform the functions described herein. The process 900 may be implemented using one or more processors in a node in a cluster such as, for example, first node 130, second node 132, or third node 134 in FIG. 1. In some cases, the process 900 may be implemented by one or more processors of a data storage apparatus, such as, for example, one of the data storage apparatuses 202(1)-202(n) described in connection with FIG. 2. In one or more embodiments, the process 900 may be implemented by one or more processors of a node such as, for example, node 306 in FIGS. 3-4. Further, the process 900 may be implemented by, for example, disk module 314 in FIGS. 3-5.

Process 900 may optionally begin with operation 902. Operation 902 may be performed in response to, for example, without limitation, a write that has just occurred to a cache (e.g., cache 338 in FIGS. 3-5). Operation 902 includes determining whether a write that has occurred has caused a cache threshold to be met. The cache threshold is for a total amount of accumulated data in the cache. As previously discussed, the cache threshold (e.g., cache threshold 506 in FIG. 5) for the amount of accumulated data in the cache may be set to ensure that the cache does not end up with an overly large amount of data that has yet to be written back. This type of accumulation may happen, for instance, when individual writes are smaller than the cache file threshold. In one or more embodiments, the cache threshold may be set to a value between 1 megabyte and 10 terabytes. The cache threshold may be set in units of bytes (e.g., megabytes, gigabytes, terabytes, etc.) or data blocks. In some cases, the cache threshold may be set to a percentage of the overall size of the cache.

If the cache threshold has been met, process 900 proceeds to operation 904, which includes initiating a write-back of at least a portion of the accumulated data in the cache to the volume. In one or more embodiments, all of the entries in the cache are cleared (flushed). In other embodiments, only a portion of the accumulated data is cleared. For example, in some cases, only those cache files that have been idle for at least a minimum idle time may be cleared. This minimum idle time may be the same as the idle threshold previously discussed or may be a different value. For example, the minimum idle time may be set to a value between 15 seconds and 5 minutes. In some cases, the minimum idle time may be set to a value less than the idle threshold.

Returning to operation 902, if the cache threshold has not been met, the process 900 optionally proceeds to operation 906, which includes determining whether the idle threshold has been met. The idle threshold may be a threshold for an amount of time that a cache file has been left idle. The idle threshold may be set to a value between, for example, 30 seconds and 10 minutes. In some cases, the idle threshold is set to a value that is more than the minimum idle time. If the idle threshold has been met, the process 900 proceeds to operation 908, which includes, initiating a write-back of the accumulated data in any cache files that meet the idle threshold. Otherwise, no action is taken. In some cases, the process 900 optionally returns to one of operation 902 (e.g., in instances where another write has occurred) or operation 906 (e.g., in instances where a a triggering event has occurred), In one or more embodiments, process 900 may include the subprocess formed by operations 902 and 904, with operations 906 and 908 being excluded. In other embodiments, process 900 includes the subprocess formed by operations 906 and 908, with operations 902 and 904 being excluded. In these such embodiments, operation 906 may be performed in response to a triggering event. The triggering event may be the lapse of a timer, receiving a command to scrub the cache, or another type of event. In still other embodiments, the subprocess formed by operations 902 and 904 and the subprocess formed by operations 906 and 908 may be independently performed.

FIG. 10 is a flow diagram of a process 1000 for generating a write request in accordance with one or more example embodiments. The process 1000 may be implemented by one or more processors executing computer-readable instructions (e.g., from one or more computer-readable media) to perform the functions described herein. The process 1000 may be implemented using one or more processors in a node in a cluster such as, for example, first node 130, second node 132, or third node 134 in FIG. 1. In some cases, the process 1000 may be implemented by one or more processors of a data storage apparatus, such as, for example, one of the data storage apparatuses 202(1)-202(n) described in connection with FIG. 2. In one or more embodiments, the process 1000 may be implemented by one or more processors of a node such as, for example, node 306 in FIGS. 3-4. Further, the process 800 may be implemented by, for example, network module 312, network module 316, and/or network module 320 in FIGS. 3-4. Process 1000 may be one example of an implementation for generating and sending a write request such as, for example, the write request that is received in operation 602 in FIG. 6, the write request that is received in operation 702 in FIG. 7, the write request that is received in operation 802 in FIG. 8.

Operation 1002 includes receiving, at a network module of one node, a client write request from a client to write data to a selected file on a volume that is hosted by another node. In one or more embodiments, these two nodes reside in two different clusters. In other embodiments, these two nodes belong to the same cluster. As one example, one node may be node 306 in FIGS. 3-4 and the other node may be node 310 in FIGS. 3-4 (or alternatively, node 308 in FIGS. 3-4).

Operation 1004, which includes processing the client write request to form a write request. The write request may be, for example, a modified or transformed version of the client write request received from the client. For example, the network module may process the client write request to generate the write request in a different format than the client write request.

Operation 1006 includes determining, by the network module, whether write-back via a cache corresponding to the volume has been enabled for the volume. In one or more embodiments, operation 1002 may be performed by the network module sending a query to the volume to determine whether a flag has been set on the volume that indicates that write-back has been enabled for the volume. The flag may be, for example, a persistent RAID level write-back flag that is set on the volume. When the volume is part of a volume group, the persistent RAID level write-back flag may be set on each volume in the volume group. The cache may be hosted by the same node at which the client write request is received or by another node in the same cluster. In some embodiments, the cache may be hosted by a node that is in a different cluster from the cluster of the node that receives the client write request and/or the cluster of the node that hosts the volume.

If the network module determines that write-back has not been enabled, process 1000 proceeds to operation 1008, which includes sending the write request to the disk module of the node that is hosting the volume. If, however, the network module determines that write-back has been enabled, process 1000 proceeds to operation 1010, which includes sending the write request to the disk module of the node that is hosting the cache.

Figure 11:
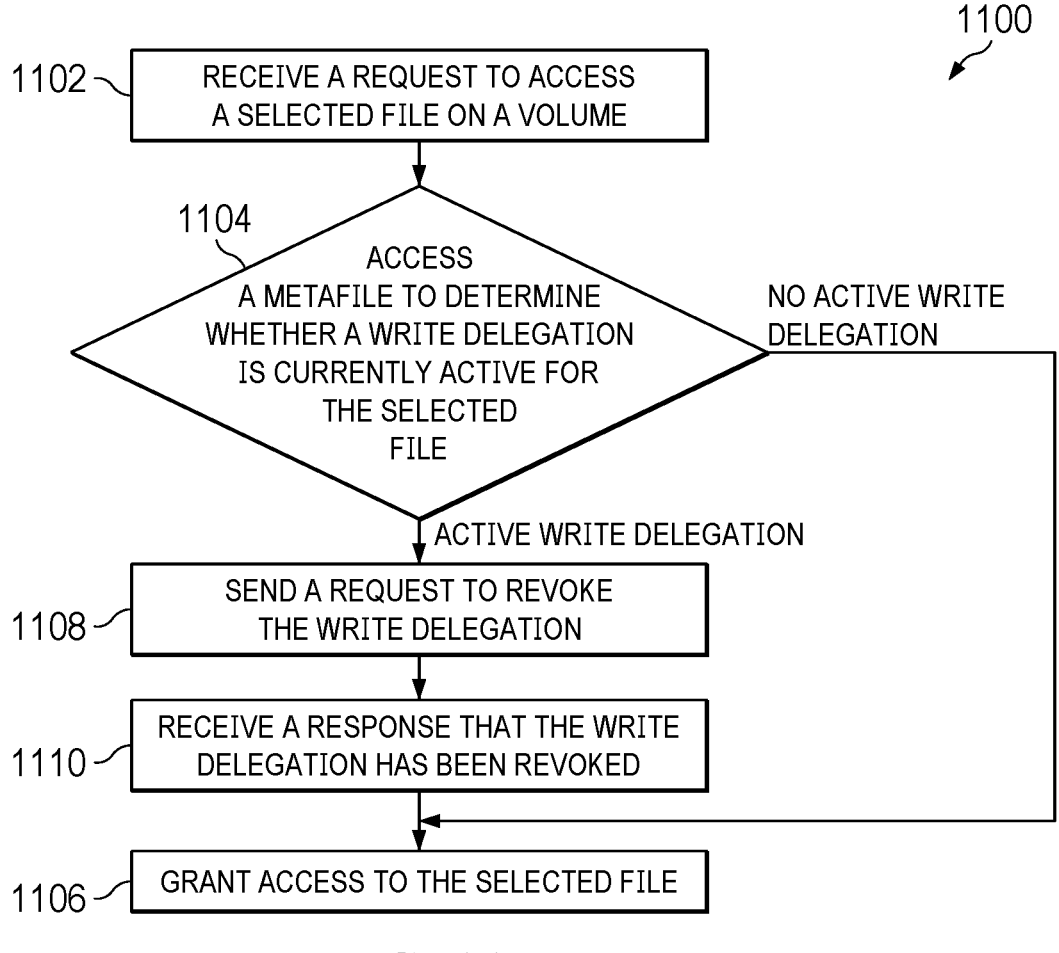
FIG. 11 is a flow diagram of a process for managing access to a selected file on a volume in accordance with one or more example embodiments.

FIG. 11 is a flow diagram of a process 1100 for managing access to a selected file on a volume in accordance with one or more example embodiments. The process 1100 may be implemented by one or more processors executing computer-readable instructions (e.g., from one or more computer-readable media) to perform the functions described herein. The process 1100 may be implemented using one or more processors in a node in a cluster such as, for example, first node 130, second node 132, or third node 134 in FIG. 1. In some cases, the process 1100 may be implemented by one or more processors of a data storage apparatus, such as, for example, one of the data storage apparatuses 202(1)-202 (n) described in connection with FIG. 2. In one or more embodiments, the process 1100 may be implemented by one or more processors of a node such as, for example, node 306 in FIGS. 3-4.

Operation 1102 includes receiving a request to access a selected file on a volume. This request may be received at a same node that is hosting the volume or a different node. In some cases, the request may be received at a node that is in a same cluster as the node hosting the volume or in a different cluster from the node hosting the volume. The request may be to read data from the selected file or write data to the selected file.

Operation 1104 includes accessing a metafile to determine whether a write delegation is currently active for the selected file. In one or more embodiments, the metafile may be, for example, a volume metafile that is associated with the volume. For example, the volume metafile (e.g., volume metafile 346 in FIGS. 3-4) may be maintained by the disk module that owns the volume. In other examples, operation 1104 may be performed by the node that receives the request to access the data sending out a query to the hosting nodes of all caches corresponding to the volume. This query may be to determine whether any of the cache metafiles (e.g., cache metafile 344 in FIGS. 3-4) associated with these caches indicates that its corresponding cache has an active write delegation for the selected file.

If a determination is made that no write delegation is currently active (e.g., has been granted) for the selected file, process 1100 proceeds to operation 1106, which includes granting access to the selected file. This access may be granted by allowing data from the selected file to be read or data to be written to the selected file. In some cases, the access is granted via a cache such that the data may be read from the volume via a cache or the data may be written to the volume via write-back caching, as described herein.

If a determination is made that a write delegation is currently active (e.g., has been granted) for the selected file, process 1100 proceeds to operation 1108, which includes sending a request to revoke the write delegation. In one or more embodiments, the request is sent to the disk module of the node hosting the volume. In other embodiments, the request is sent to the disk module of the node hosting the cache that currently has the active write delegation. Thus, this revocation request may be managed by the disk module hosting the cache or the disk module hosting the volume. Before a response confirming revocation of the write delegation is sent, the cache that had the write delegation may be flushed such that any accumulated data for the selected file (and in some cases, other accumulated data for one or more other files on the volume) is written back to the volume. This helps ensure consistency of data when managing concurrent access to the volume at the file system level.

Operation 1110 includes receiving a response that the write delegation has been revoked. This response indicates that the selected file is free to be accessed. The process 1100 then proceeds to operation 1106 as described above such that a new write delegation may be put in place for the cache.

As a result of the methodologies discussed above, the embodiments described herein provide improvements in write latency and throughput when write-back caching is performed between clusters (e.g., the cache being hosted by a node one cluster and its underlying corresponding volume being hosted by a node in another cluster). For example, a write latency of milliseconds or tens of milliseconds may be reduced by at least 100 percent up to about 600%. For example, in various cases, using the embodiments described herein, write latency may be improved (e.g., reduced) more than 100%, more than 200%, more than 300%, more than 500%, or more than 600%. Further, the embodiments described herein help keep data consistent at the underlying volume, enabling the volume to be sufficiently resilient to weather various scenarios such as shut-downs, reboots, and other such events in a cross-cluster environment.

V. Additional Considerations

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The headers and subheaders between sections and subsections of this document are included solely for the purpose of improving readability and do not imply that features cannot be combined across sections and subsection. Accordingly, sections and subsections do not describe separate embodiments.

The terms and expressions which have been employed are used as terms of description and not of limitation, and there is no intention in the use of such terms and expressions of excluding any equivalents of the features shown and described or portions thereof, but it is recognized that various modifications are possible within the scope of what is claimed. Thus, it should be understood that although one or more inventions have been specifically disclosed by the embodiments and optional features described herein, modification and variation of the concepts disclosed herein may be resorted to by those skilled in the art, and that such modifications and variations are considered to be within the scope of the one or more inventions described herein and the invention described in the appended claims.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The description provides preferred exemplary embodiments only, and is not intended to limit the scope, applicability, or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

The present embodiments may be implemented using hardware, software, firmware, or a combination thereof. Accordingly, it is understood that any operation of the computing systems of the computing environment 100 in FIG. 1, the network environment 200 in FIG. 2, or the cluster network 300 or portions thereof in FIGS. 3-5 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

receiving, within a first node, a write request to write new data to a selected file on a volume in a second data storage node within a second node, the write request originating from a client;

obtaining, by a first disk module in the first node, a new write delegation from a second disk module hosting the second data storage node in the second node, the write delegation granting permission to write from a cache within a first data storage node within the first node to the selected file stored in the second data storage node within the second node;

determining, by the first node, that adding the new data to a cache file that is in the cache and that corresponds to the selected file will exceed at least one of a cache file threshold for the cache file or a cache threshold for the cache;

initiating, by the first node before writing the new data to the cache file, a write-back of accumulated data in the cache within the first node to the volume within the second node in response to a determination that adding the new data to the cache file will exceed at least one of the cache file threshold or the cache threshold; and writing, by the first node based on the new write delegation after the write-back has been completed, the new data to the cache file in the cache that is hosted by the first node.

2. The method of claim 1, further comprising:
sending a response to the client after the new data is written to the cache file.

3. The method of claim 1, wherein the accumulated data includes data in cache file.

4. The method of claim 1, wherein the accumulated data in the cache includes at least a portion of all data that has been accumulated in the cache.

5. The method of claim 1, further comprising:
setting the cache file threshold for an amount of accumulated data in the cache file to allow multiple write requests for the selected file to be processed before a write-back of the accumulated data in the cache file is initiated.

6. The method of claim 1, further comprising:
setting the cache file threshold for an amount of accumulated data in the cache file to a value between 64 kilobytes and 10 gigabytes.

7. The method of claim 1, further comprising:
setting the cache threshold for an amount of accumulated data in the cache to a value between 1 megabyte and 10 terabytes.

8. The method of claim 1, further comprising:
responsive to receiving the write request and determining that the cache currently has an active write delegation, requesting revocation of the active write delegation to obtain the new write delegation for the cache.

9. The method of claim 1, wherein the accumulated data is written to the volume using write-back messages and further comprising:
setting a payload size for the write-back messages sent from the cache to the volume to a value between 64 kilobytes and 100 megabytes.

10. The method of claim 1, further comprising:
tracking an amount of data that has accumulated in the cache file using a cache metafile maintained by the first node.

11. The method of claim 1, further comprising:
tracking an amount of data that has accumulated in the cache using a cache metafile maintained by the first node.

12. The method of claim 1, wherein determining that adding the new data to the cache file in the cache that corresponds to the selected file will exceed at least one of the cache file threshold for the cache file or the cache threshold for the cache comprises:
comparing a first amount of data that has been accumulated in the cache file to the cache file threshold and a second amount of data that has been accumulated in the cache to the cache threshold using a cache metafile.

13. A method comprising:
receiving, within a first node, a write request to write new data to a selected file on a volume in a second data storage node within a second node, the write request originating from a client;

obtaining, by a first disk module in the first node, a new write delegation from a second disk module hosting the second data storage node in the second node, the write delegation granting permission to write from a cache within a first data storage node within the first node to the selected file stored in the second data storage node within the second node;

determining, by the first node, that adding the new data to a cache file that is in the cache and that corresponds to the selected file will not exceed a cache file threshold for the cache file and will not exceed a cache threshold for the cache;

writing, by the first node based on the new write delegation, the new data to the cache file in response to determining that adding the new data to the cache file will not exceed the cache file threshold and will not exceed the cache threshold; and sending, by the first node, a response to the client after the new data is written to the cache file, wherein the new data is written back to the volume hosted by the second data storage node within the second node at a future point in time after the response is sent to the client.

14. The method of claim 13, further comprising:
responsive to receiving the write request and determining that the cache currently has an active write delegation, requesting revocation of the active write delegation to obtain the new write delegation for the cache.

15. The method of claim 13, further comprising:
setting the cache file threshold for an amount of accumulated data in the cache file to allow multiple write requests for the selected file to be processed before a write-back of the accumulated data in the cache file is initiated.

16. The method of claim 13, further comprising:
setting the cache file threshold for an amount of accumulated data in the cache file to a value between 64 kilobytes and 10 gigabytes; and
setting the cache threshold for the amount of accumulated data in the cache to a value between 1 megabyte and 10 terabytes.

17. A computing device comprising:
a memory containing a machine-readable medium comprising machine executable code having instructions stored thereon; and
a processor coupled to the memory, the processor configured to execute the machine executable code to:
receive, within a first node, a write request to write new data to a selected file on a volume in a second data storage node within a second node, the write request originating from a client;
obtaining, by a first disk module in the first node, a new write delegation from a second disk module hosting the second data storage node in the second node, the write delegation granting permission to write from a cache within a first data storage node within the first node to the selected file stored in the second data storage node within the second node;
determine, by the first node, that adding the new data to a cache file that is in the cache and that corresponds to the selected file will exceed at least one of a cache file threshold for the cache file or a cache threshold for the cache;
initiate, by the first node before writing the new data to the cache file, a write-back in response to a determination that adding the new data to the cache file will exceed at least one of the cache file threshold or the cache threshold that, the write-back comprising:
writing accumulated data in the cache within the first node to the volume within the second node; and clearing the accumulated data that has been written back to the volume from the cache; and write the new data to the cache file in the cache that is hosted by the first node after clearing the cache ensures that writing the new data to the cache file will not cause either the cache file threshold for the cache file or the cache threshold for the cache to be exceeded.

18. The computing device of claim 17, wherein:

the cache file threshold for an amount of data accumulated in the cache file in which the new data is written is set to a value between 64 kilobytes and 10 gigabytes; and the cache threshold for an amount of data accumulated in the cache is set to a value between 1 megabyte and 10 terabytes.

19. The computing device of claim 17, wherein the accumulated data in the cache that is written to the volume comprises at least a portion of all data that has been accumulated in the cache.

20. The computing device of claim 17, wherein the new data is written to the cache file after the cache file has been cleared but prior to an entirety of the accumulated data being written back to the volume and cleared from the cache.

* * * * *